United States Patent
Hiyoshi et al.

(10) Patent No.: US 7,753,013 B2
(45) Date of Patent: Jul. 13, 2010

(54) VARIABLE COMPRESSION RATIO CONTROL METHOD FOR VARIABLE COMPRESSION RATIO ENGINE, AND VARIABLE COMPRESSION RATIO ENGINE

(75) Inventors: Ryosuke Hiyoshi, Yokosuka (JP); Yoshiaki Tanaka, Fujisawa (JP); Shinichi Takemura, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 11/902,126

(22) Filed: Sep. 19, 2007

(65) Prior Publication Data

US 2008/0098990 A1    May 1, 2008

(30) Foreign Application Priority Data

Oct. 30, 2006    (JP)    ............... 2006-294571

(51) Int. Cl.
*F02B 75/04* (2006.01)

(52) U.S. Cl. .................................. 123/78 E
(58) Field of Classification Search ... 123/197.1–197.4, 123/78 E, 78 F, 435, 195 R, 48 R, 1 A; 701/101–115; 73/114.52, 114.53; *F02B 75/04*
See application file for complete search history.

(56) References Cited

U.S. PATENT DOCUMENTS

| | | | | |
|---|---|---|---|---|
| 4,993,386 | A | * | 2/1991 | Ozasa et al. ............... 123/25 J |
| 2006/0180118 | A1 | * | 8/2006 | Takemura et al. ........ 123/197.4 |
| 2007/0250249 | A1 | * | 10/2007 | Okubo et al. ............... 701/103 |

FOREIGN PATENT DOCUMENTS

| | | |
|---|---|---|
| EP | 1 505 277 A1 | 2/2005 |
| EP | 1 519 019 A1 | 3/2005 |
| EP | 1 602 814 | 12/2005 |
| EP | 1 630 392 A2 | 3/2006 |
| JP | H05-066261 | 9/1993 |
| JP | 2001-227367 | 8/2001 |
| JP | 2003-322036 | 11/2003 |
| JP | 2005 163741 | 6/2005 |
| JP | 2005-172466 | 6/2005 |

* cited by examiner

*Primary Examiner*—Stephen K Cronin
*Assistant Examiner*—Keith Coleman
(74) *Attorney, Agent, or Firm*—Drinker Biddle & Reath LLP

(57) ABSTRACT

A variable compression ratio engine. The engine includes a piston disposed in a cylinder bore and constituting a combustion chamber, a variable compression ratio mechanism connected to the piston and causing a top dead center position of the piston to vary, an actuator connected to the variable compression ratio mechanism to actuate the variable compression ratio mechanism, and a controller connected to the actuator to control an engine state and the actuator. The controller performs operations including setting the compression ratio corresponding to a state of the engine, actuating the actuator so that the compression ratio is set, determining whether a state of the engine is either a state allowing actuation of the actuator, or a state limiting actuation of the actuator, and limiting actuation of the actuator in the state limiting actuation of the actuator.

36 Claims, 16 Drawing Sheets

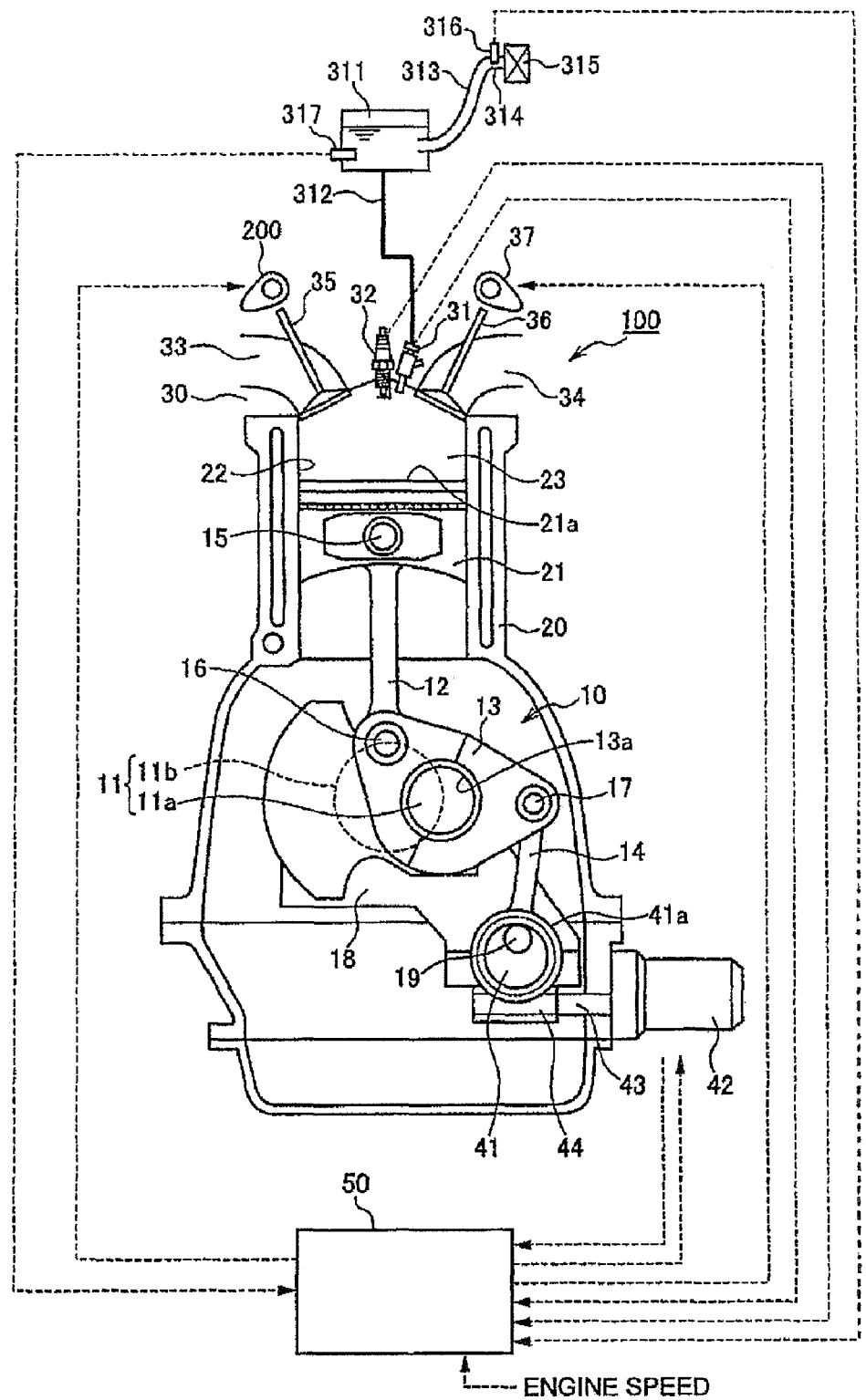
[FIG. 1]

[FIG. 2]
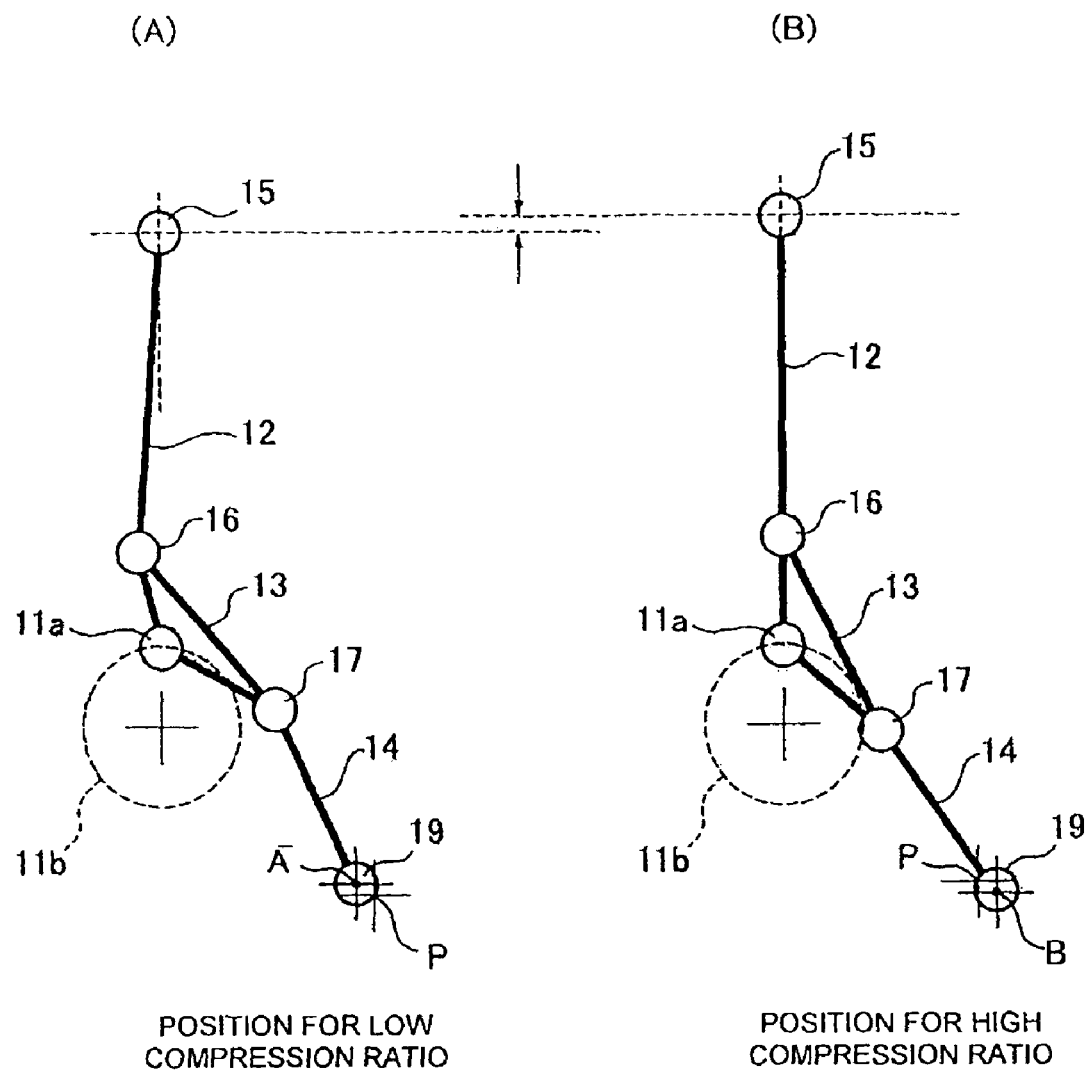
(A) POSITION FOR LOW COMPRESSION RATIO
(B) POSITION FOR HIGH COMPRESSION RATIO

[FIG. 3]
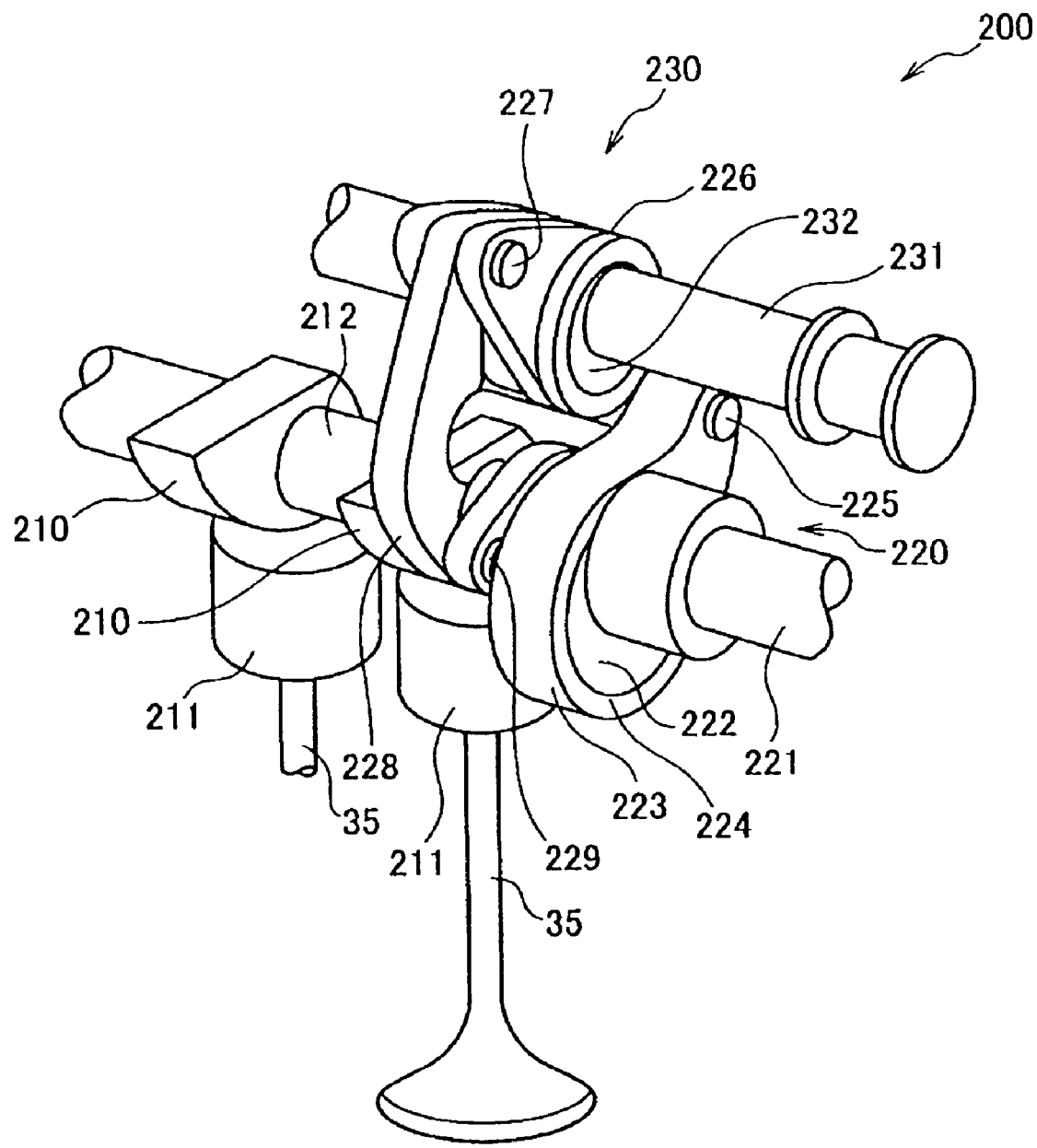

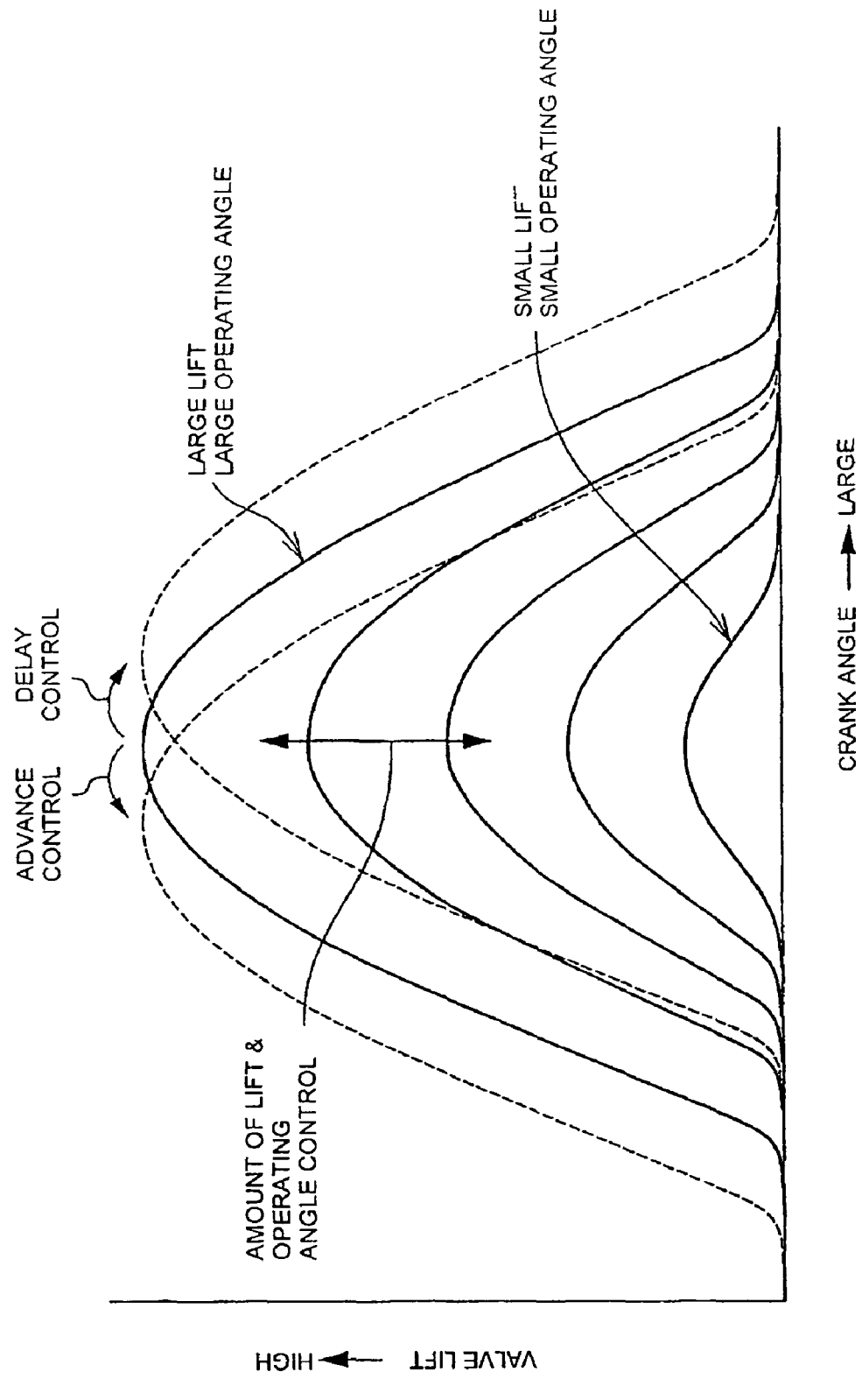
[FIG. 4]

[FIG. 5]
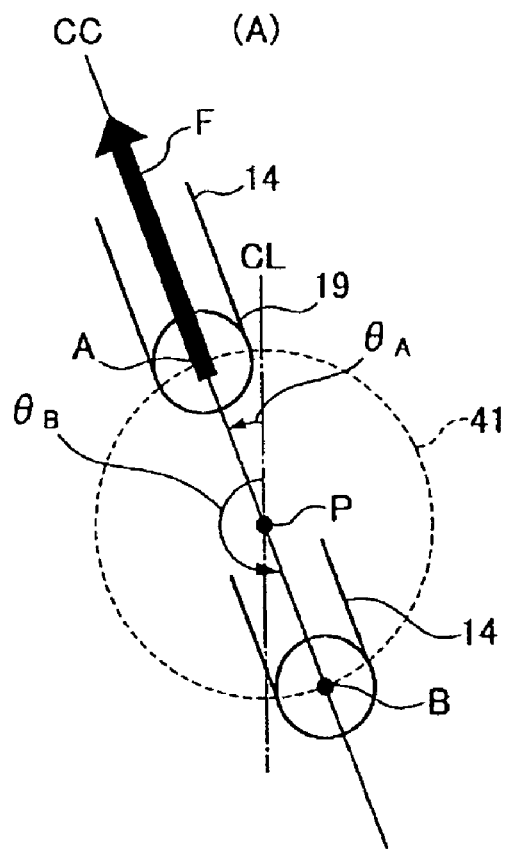
(A)
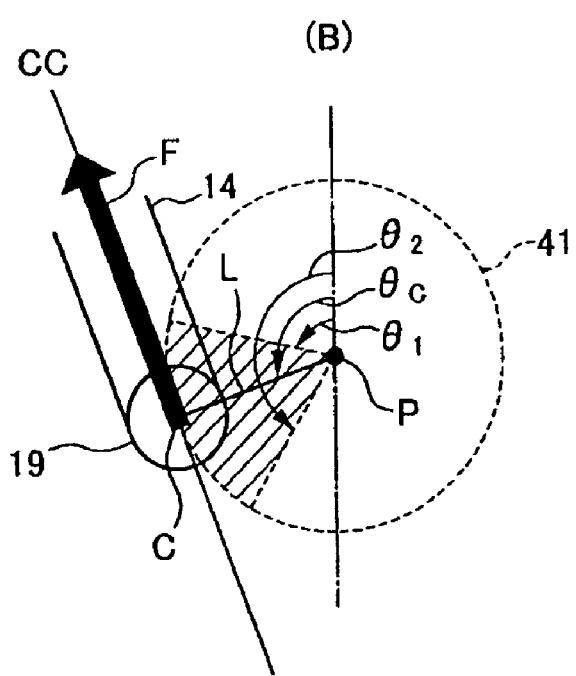
(B)

[FIG. 6]
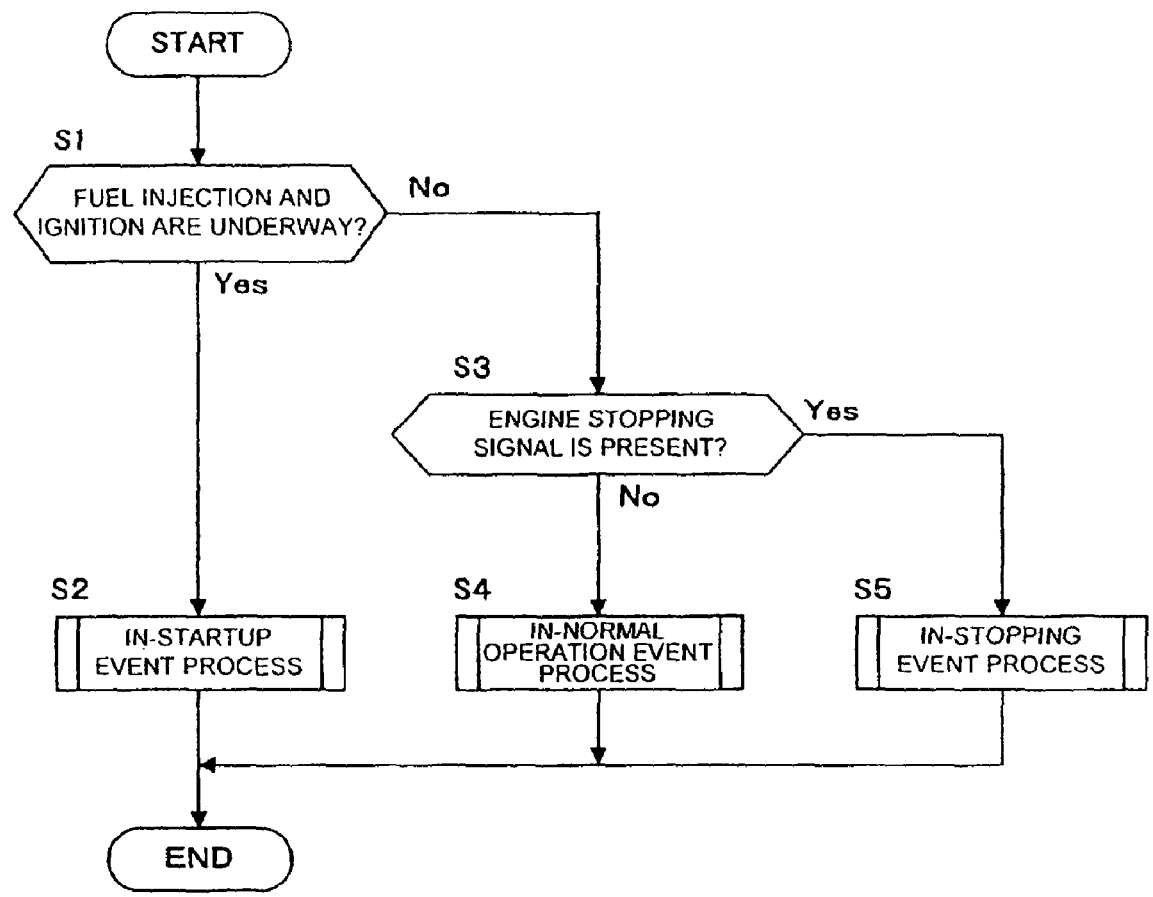

[FIG. 7]
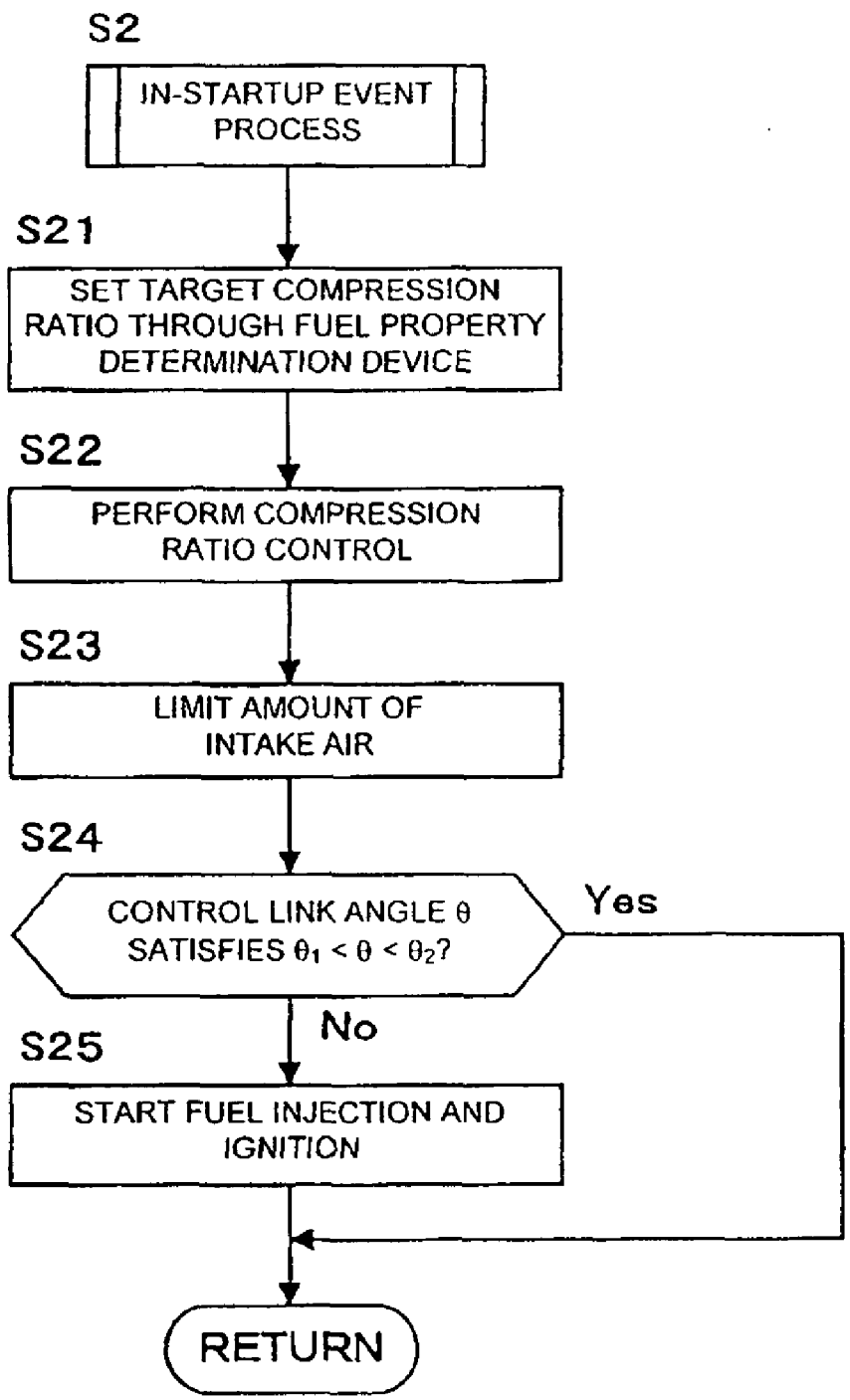

[FIG. 8]
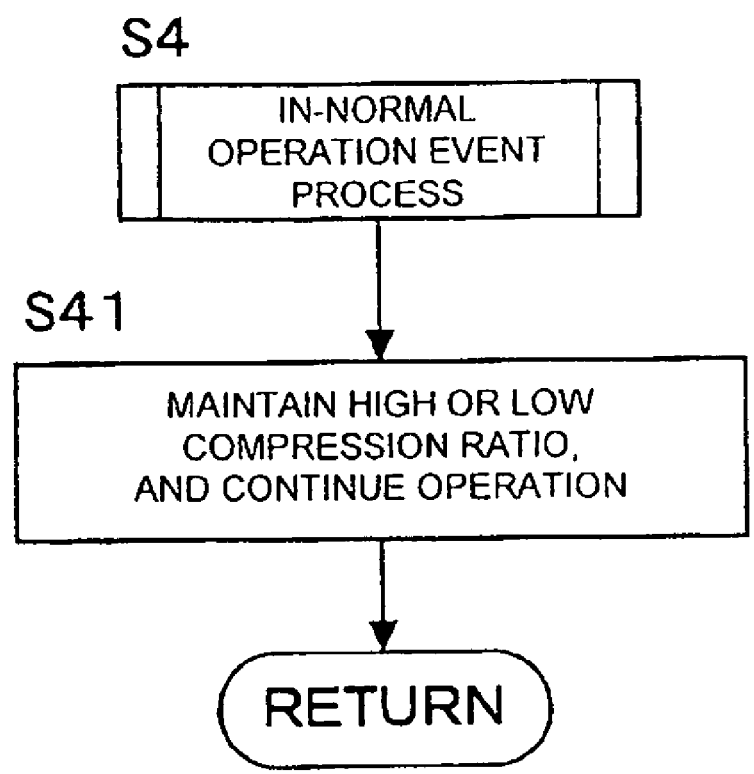

[FIG. 9]
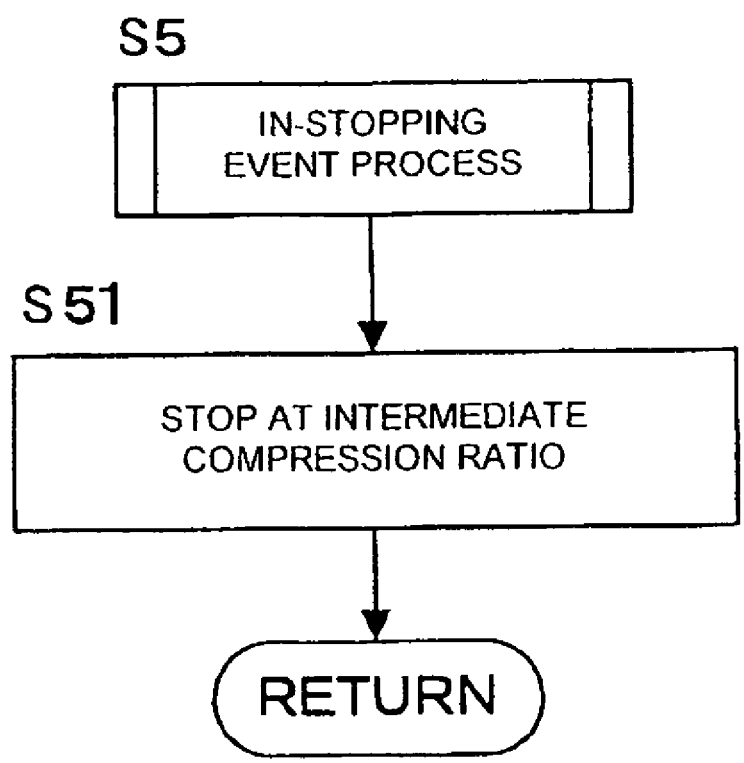

[FIG. 10]
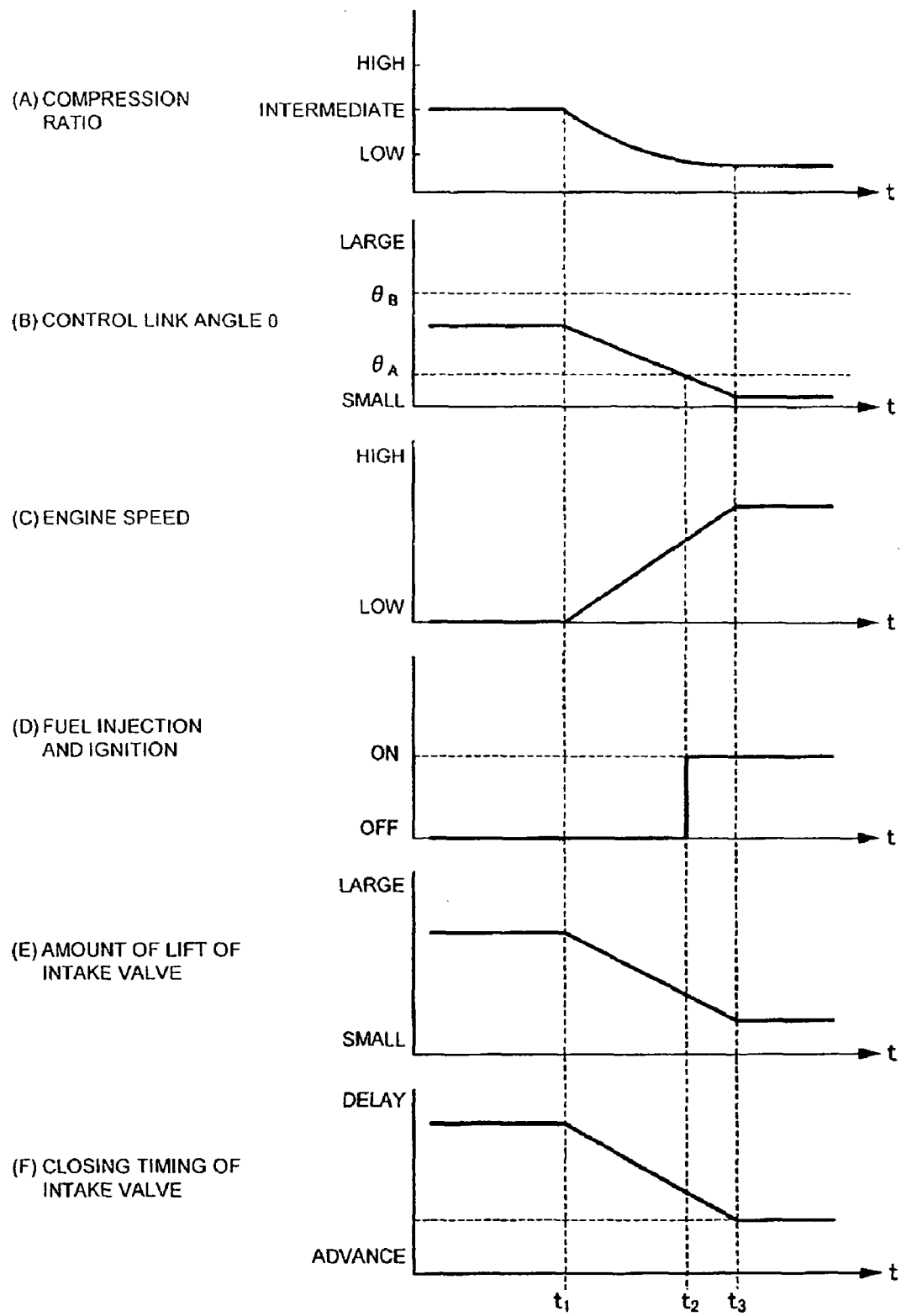

[FIG. 11]
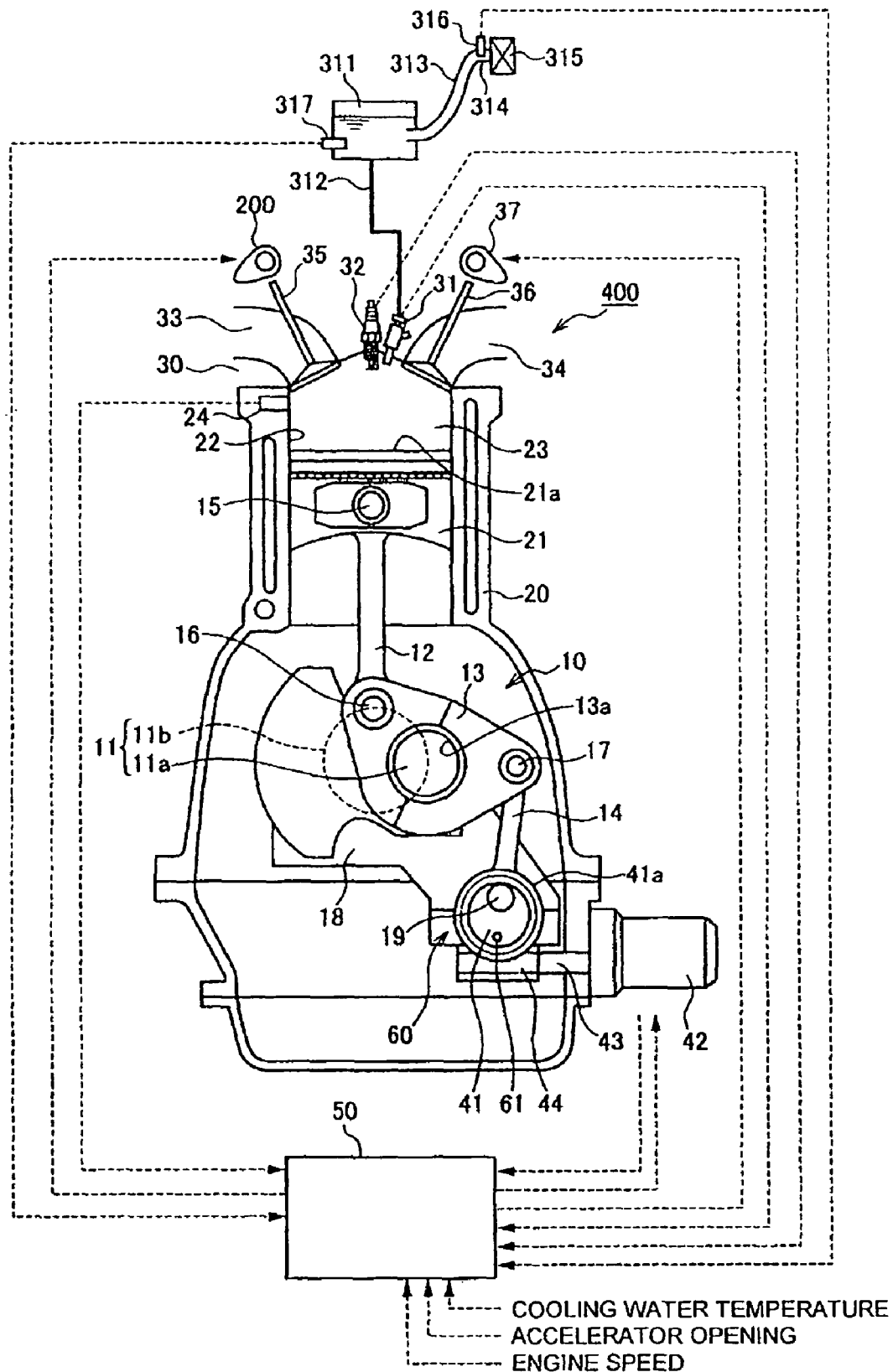

[FIG. 12]
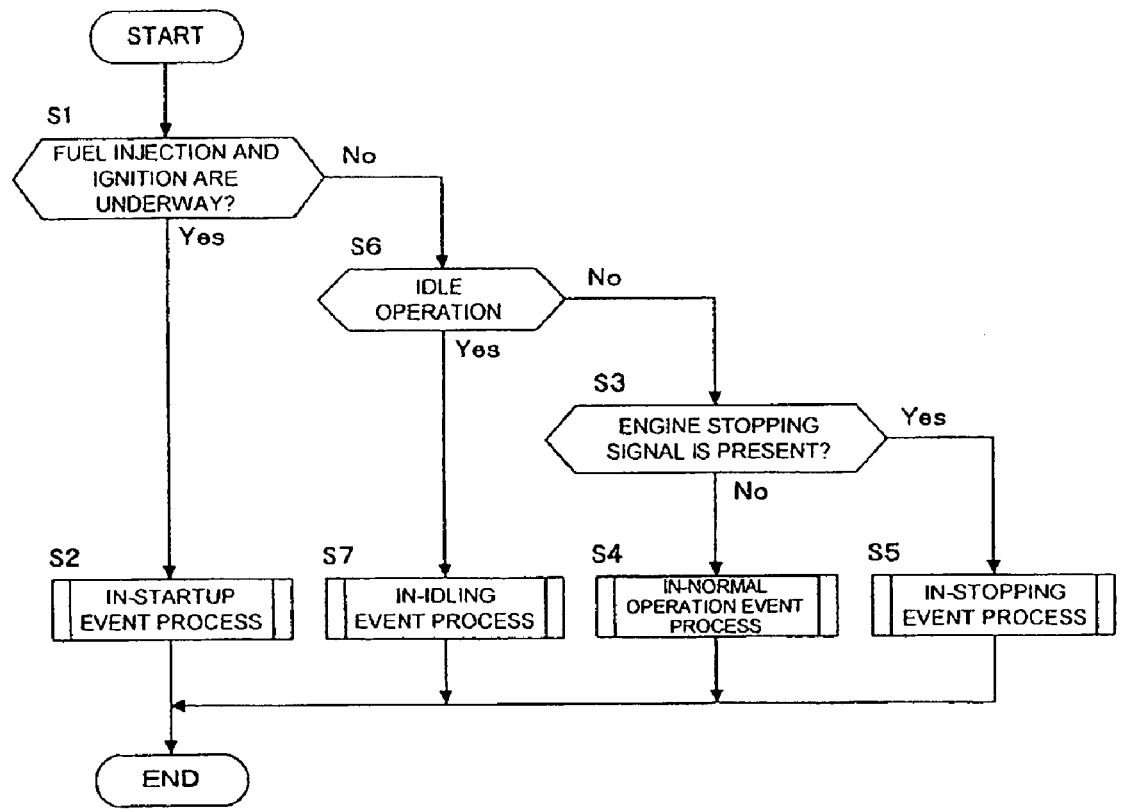

[FIG. 13]
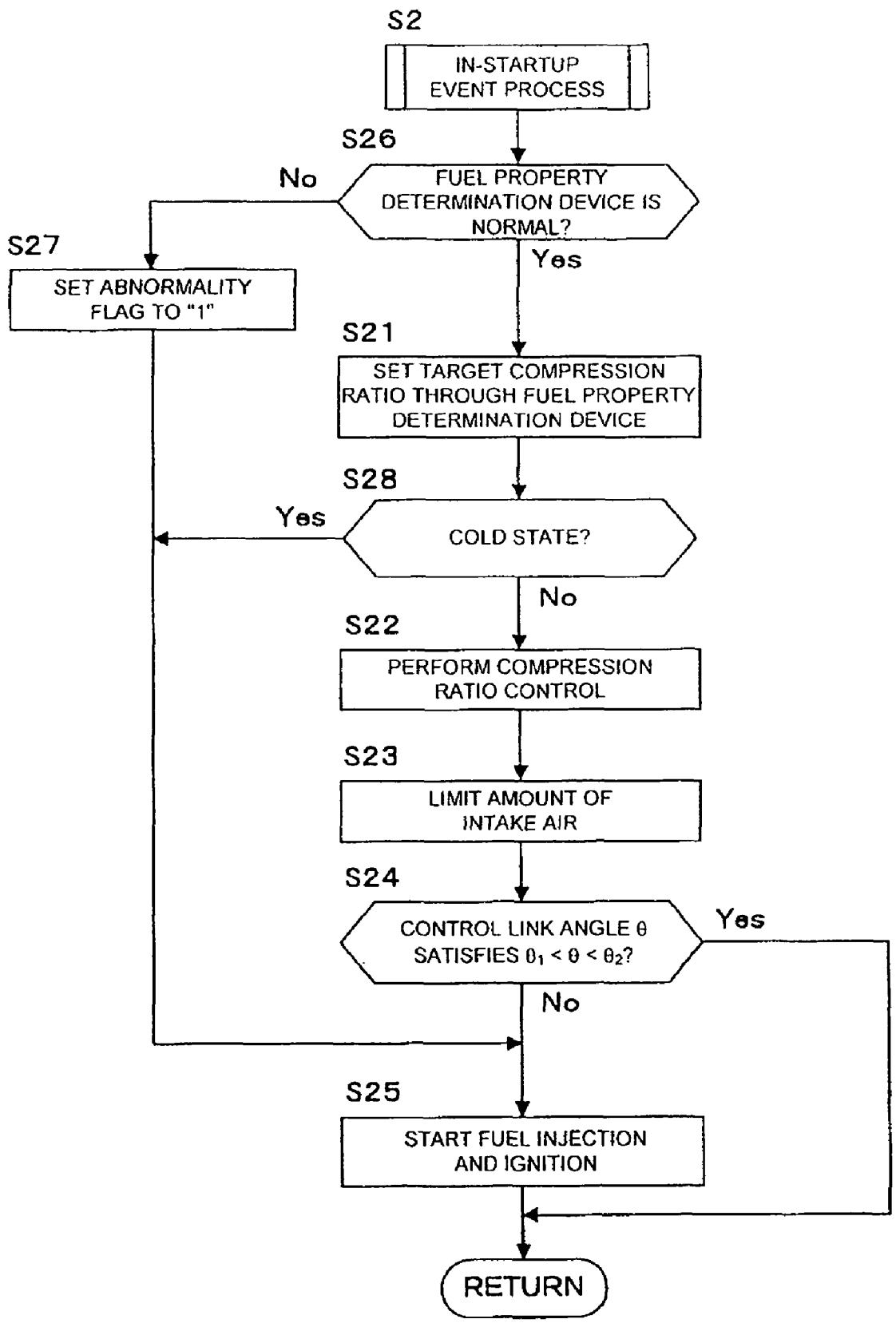

[FIG. 14]
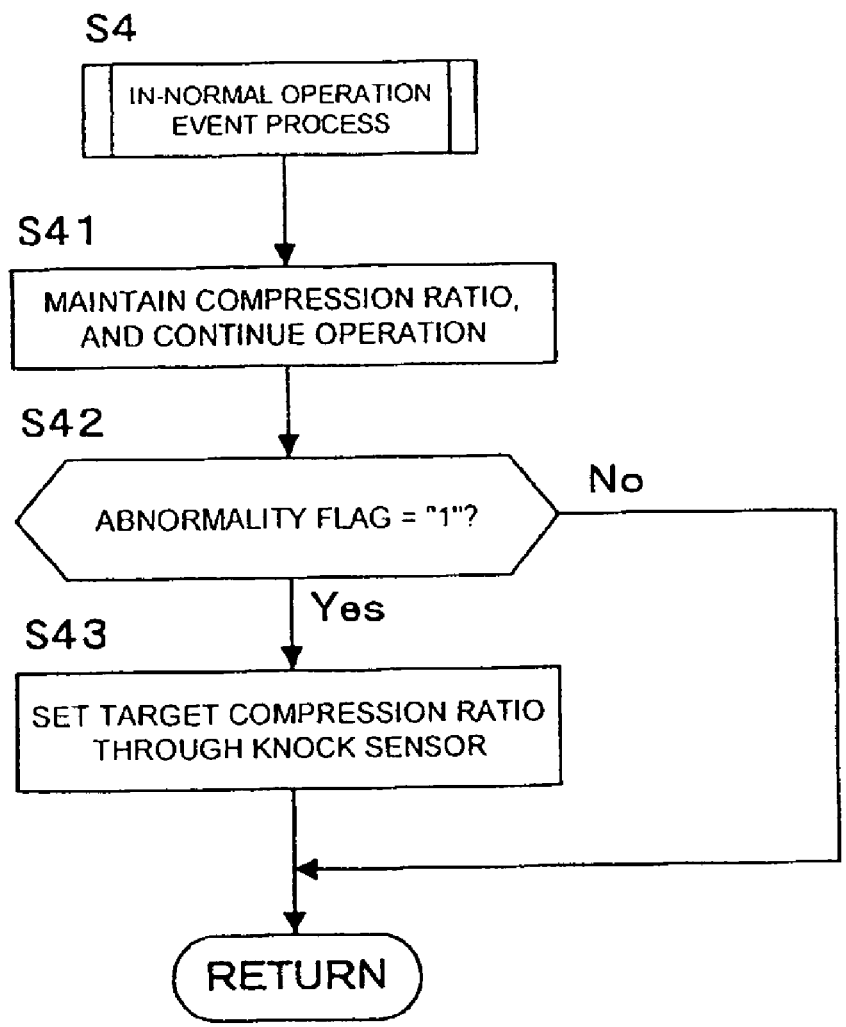

{FIG. 15}
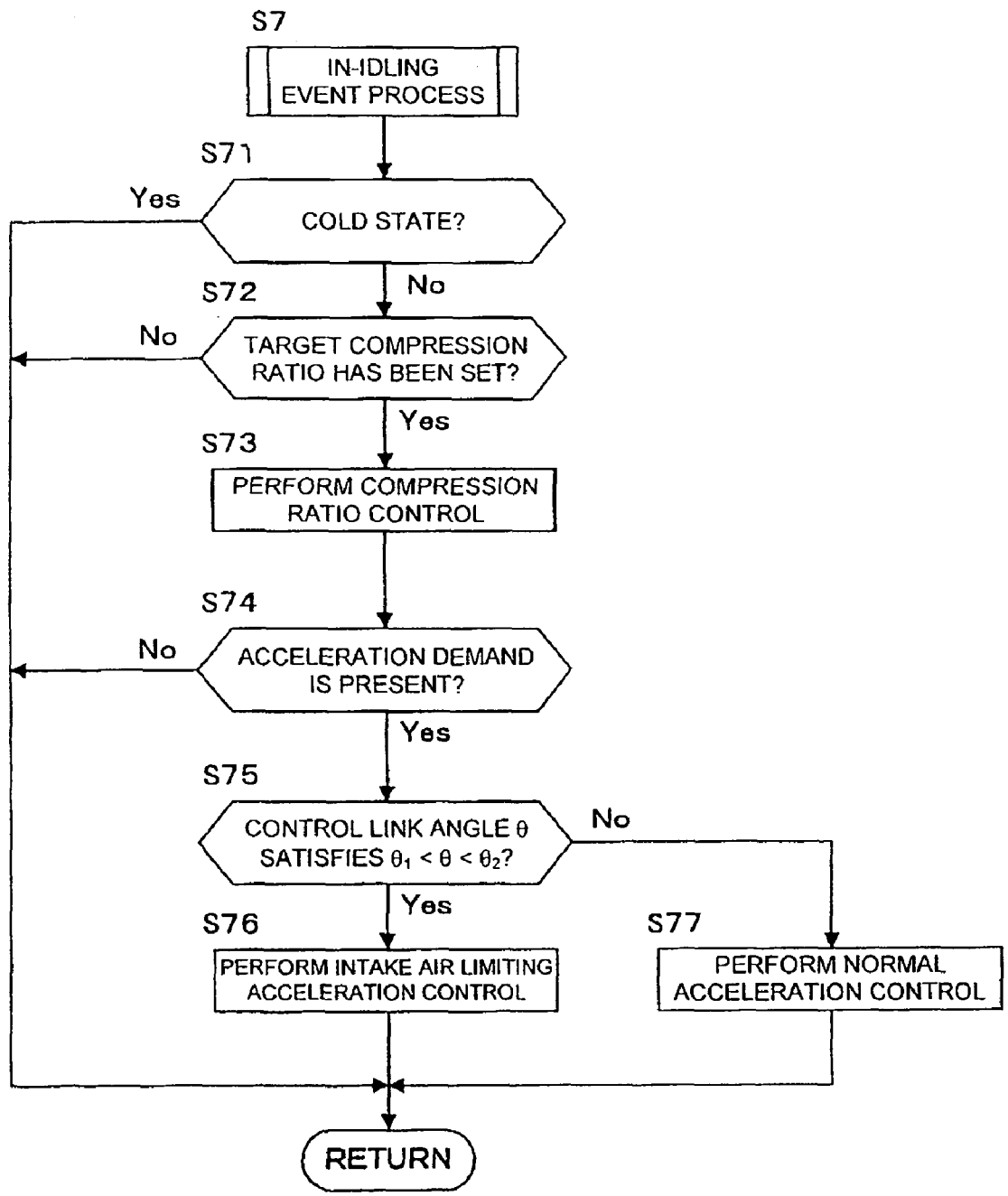

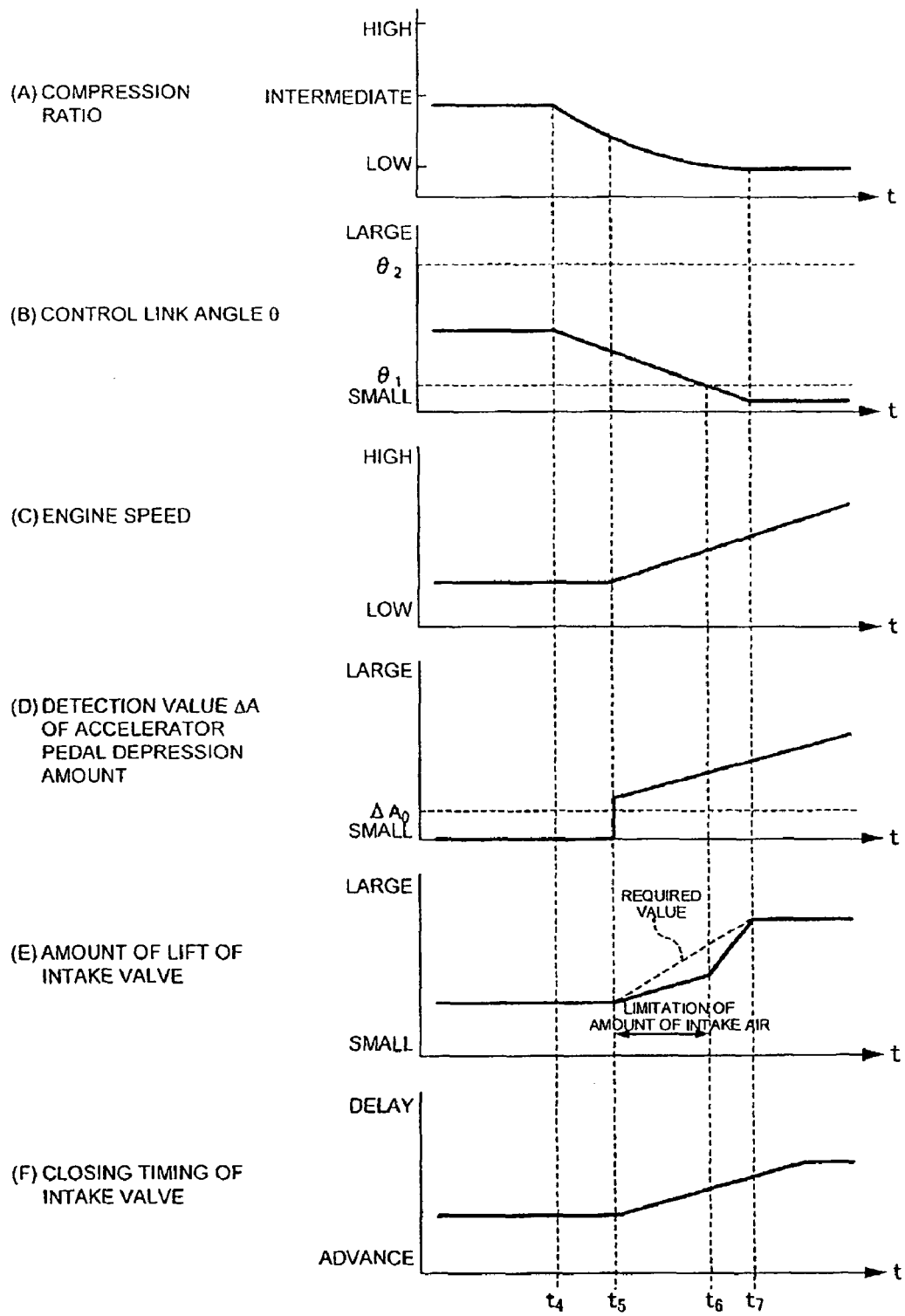
[FIG. 16]

VARIABLE COMPRESSION RATIO CONTROL METHOD FOR VARIABLE COMPRESSION RATIO ENGINE, AND VARIABLE COMPRESSION RATIO ENGINE

CROSS-REFERENCE TO RELATED APPLICATIONS

This application claims priority under 35 U.S.C. §119 to Japanese Patent Application No. 2006-294571, filed on Oct. 30, 2006, the disclosure of which is incorporated by reference herein in its entirety.

BACKGROUND OF THE INVENTION

1. Field of the Invention

The present invention relates to a variable compression ratio engine apparatus and method for an internal combustion engine (or, simply "engine", herebelow).

2. Description of Related Art

Conventional known engines include those of the type for use with vehicles capable of using, as an alternative fuel to gasoline fuel, ethanol blended gasoline ("alcohol fuel", hereinbelow), which is a blend of gasoline and ethanol. Such a vehicle is called "FFV" (i.e. flexible fuel vehicle), and an engine for the vehicle is called "FFV engine."

Alcohol fuel is referred to as an "E85 fuel (ethanol content: 85%)" corresponding to the ethanol content. While fuel containing only gasoline, without any ethanol, is sometimes referred to as "E0 fuel", "alcohol fuel" herebelow will refer to the ethanol blended fuel, inclusive of an ethanol-100% fuel, and "gasoline fuel" herebelow will refer to "gasoline-100% fuel" not containing ethanol.

Alcohol fuel has a higher octane number than gasoline fuel and is therefore less likely to cause knocking, so that the FFV engine can be operated at a high compression ratio. As such, in the FFV engine, alcohol fuel can be combusted at high temperature, increasing the thermal efficiency and reducing NOx emission.

In the case of the conventional FFV engine, even in the event of operation using alcohol fuel, the operation has to be performed at a low compression ratio corresponding to gasoline fuel in order to prevent knocking that occurs during operation with gasoline fuel.

In a known engine permitting variable compression ratio control, a piston and a crankshaft are coupled together by way of a plurality of links, and a control link is controlled by an actuator mounted to a cylinder block of the engine, whereby the piston stroke is varied to vary the compression ratio. According to the variable compression ratio engine, even in the case where fuels, such as alcohol and gasoline fuels having different octane numbers, are used, the compression ratio of the engine can be controlled corresponding to the used fuel.

Nevertheless, however, problems remain in that, when the compression ratio is changed during operation involving combustion, the actuator has to be driven against loads generated with combustion pressure or the like, so that a large actuator has to be used for a correspondingly large drive force, which increases the costs.

The present invention has been made by drawing attention on these problems, and an object of the invention is to provide a variable compression ratio control apparatus and method for an engine, that are capable of performing variable compression ratio control and that enable compactness of an actuator.

BRIEF SUMMARY OF THE INVENTION

In an embodiment, the invention provides a method of controlling an actuator that causes a compression ratio of an engine to vary. The method includes setting a compression ratio corresponding to a state of the engine, actuating the actuator so that the compression ratio is set, determining whether a state of the engine is either a state allowing actuation of the actuator, or a state limiting actuation of the actuator; and limiting actuation of the actuator in the state limiting actuation of the actuator.

In another embodiment, the invention provides a variable compression ratio engine. The engine includes a piston disposed in a cylinder bore and constituting a combustion chamber, a variable compression ratio mechanism connected to the piston and causing a top dead center position of the piston to vary, an actuator connected to the variable compression ratio mechanism to actuate the variable compression ratio mechanism, and a controller connected to the actuator to control an engine state and the actuator. The controller performs operations including setting the compression ratio corresponding to a state of the engine, actuating the actuator so that the compression ratio is set, determining whether a state of the engine is either a state allowing actuation of the actuator, or a state limiting actuation of the actuator, and limiting actuation of the actuator in the state limiting actuation of the actuator.

According to the present invention as summarized above with reference to embodiments, the actuation force necessary for the actuator can be reduced, so that compactness of the actuator and cost reduction can be accomplished.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 1 is a schematic view showing a first embodiment of a variable compression ratio engine in accordance with the present invention;

FIGS. 2A and 2B, respectively, are schematic views for explaining compression ratio changing methods for the variable compression ratio engine;

FIG. 3 is a view showing the configuration of a variable valve actuation mechanism;

FIG. 4 is a diagram showing lift amounts and opening and closing timings of an intake valve in connection with operation of the variable valve actuation mechanism;

FIGS. 5A and 5B, respectively, are diagrams showing torques exerted on a control shaft;

FIG. 6 is a flow chart representing processing being executed by a controller;

FIG. 7 is a flow chart representing an in-startup event process;

FIG. 8 is a flow chart representing an in-normal operation event process;

FIG. 9 is a flow chart representing an in-stopping event process;

FIGS. 10A to 10F, respectively, are timing charts representing operation of the in-startup event process being executed by the controller;

FIG. 11 is a schematic view showing a second embodiment of a variable compression ratio engine in accordance with the present invention;

FIG. 12 is a flow chart representing processing being executed by a controller;

FIG. 13 is a flow chart representing an in-startup event process;

FIG. 14 is a flow chart representing an in-normal operation event process;

FIG. 15 is a flow chart representing an in-idling event process; and

FIG. 16 is a timing chart representing operation of the in-idling event process being executed by the controller.

DETAILED DESCRIPTION OF THE PREFERRED EMBODIMENTS

A first embodiment of the present invention will be described herebelow with reference to the accompanying drawings. FIG. 1 is a schematic view showing the first embodiment of a variable compression ratio engine 100 (again, simply "engine", herebelow) capable of using alcohol and gasoline fuels.

The variable compression ratio engine 100 includes a variable compression ratio mechanism 10 capable of varying a compression ratio by causing variations in a piston top dead center position. More specifically, the variable compression ratio mechanism 10 couples together a piston 21 and a crankshaft 11 by an upper link 12 and a lower link 13, and uses a control link 14 to control the attitude of the lower link 13, thereby to vary the compression ratio.

The piston 21 is housed in an interior portion of a cylinder block 20 for a cylinder 22. A head surface 21a of the piston 21, a cylinder wall of the cylinder 22, and a cylinder head 30 together form a combustion chamber 23. Upon combustion of the fuel in the combustion chamber 23, the piston 21 receives combustion pressure and thereby reciprocates in the cylinder 22.

The upper link 12 couples at one end to the piston 21 by way of a piston pin 15. The upper link 12 couples at a lower end to one end of the lower link 13 by way of a coupling pin 16.

The one end of the lower link 13 couples to the upper link 12 by way of the coupling pin 16. The other end of the lower link 13 couples to the control link 14 by way of a coupling pin 17. The lower link 13 is splitable from two, left and right members as viewed in the drawing, and has a coupling opening 13a in substantially the center. The coupling opening 13a receives a crankpin 11a of the crankshaft 11, whereby the lower link 13 pivots about the crankpin 11a working as a central axis.

The crankshaft 11 forms a plurality of crankpins 11a and a plurality of journals 11b. The journal 11b is rotatably supported by the cylinder block 20 and a radar frame 18. The crankpin 11a is eccentric by a predetermined amount relative to the journal 11b, in which the lower link 13 is pivotably coupled.

One end of the control link 14 couples to the lower link 13 by way of the coupling pin 17. The other end of the control link 14 couples to a control shaft 41 by way of a coupling pin 19. The control link 14 pivots about the coupling pin 19. The center of the coupling pin 19 is present in a position eccentric with respect to a journal center of the control shaft 41, and varies in position in connection with rotation of the control shaft 41. In conjunction with the variation in the position of the center of the coupling pin 19, there occurs a variation in the attitude of the control link 14, which is coupled at one end to the lower link 13. With the variations in the positions of the lower link 13 and the upper link 12 associated with the variation in the attitude position of the control link 14, the top dead center position of the piston 21 at the same crank angle varies.

The control shaft 41 forms a gear 41a around an outer circumference. The gear 41a engages a pinion 44 provided on a rotation shaft 43 of an actuator 42. The control shaft 41 is rotated and controlled by the actuator 42, thereby to move the coupling pin 19 eccentric with respect to the journal center of the control shaft 41.

FIGS. 2A and 2B, respectively, are schematic views for explaining compression ratio varying methods for the variable compression ratio engine 100. In the variable compression ratio engine 100, the compression ratio is varied in the manner that the coupling pin 19 is moved to thereby cause variations in the attitudes of the respective upper and lower links 12 and 13.

More specifically, as shown in FIG. 2A, when the coupling pin 19 is moved or set to a position A with respect to reference plane P, the control link 14 is pushed upward, whereby the coupling pin 17 is moved to an upper position. Thereby, the lower link 13 is pivoted counterclockwise about the crankpin 11a, and the coupling pin 16 is moved downward, whereby also the top dead center position of the piston 21 is set to a lower position and hence the compression ratio is reduced. However, as shown in FIG. 2B, when the coupling pin 19 is moved to a position B with respect to reference plane P, the top dead center position is set higher, and hence the compression ratio is increased.

As shown in FIG. 1, the variable compression ratio engine 100 further includes a fuel injection valve 31 and a spark plug 32 in the cylinder head 30 above the combustion chamber 23.

The fuel injection valve 31 in the cylinder head 30 is mounted so that an injection port extends into the interior portion of the combustion chamber 23. The fuel injection valve 31 injects the gasoline or alcohol fuel, which is supplied through a fuel passage 312 from a fuel tank 311, into the combustion chamber 23, whereby a gas mixture is formed.

The spark plug 32 is disposed so that an ignition portion at a lead end of the spark plug 32 extends into the combustion chamber 23. The spark plug 32 ignites the gas mixture formed inside of the combustion chamber 23, thereby to cause combustion of the gas mixture.

A fuel supply conduit 313 for supplying the fuel is attached to the fuel tank 311. A detachable cap 315 is attached to a fuel supply port 314 of the fuel supply conduit 313. In the event of fuel supply, the cap 315 is detached.

A fuel supply sensor 316 for detecting fuel supply is disposed in the fuel supply port 314. The fuel supply sensor 316 causes circuit breaking upon detachment of the fuel supply port 314, and is capable of determining in accordance with the ON/OFF setting of the circuit whether the fuel has been supplied. In this case, however, instead of providing the fuel supply sensor 316, a fuel increment detection sensor (not shown) may be provided to the fuel tank 311. In this case, the determination is made in accordance with a detection value of the sensor whether the fuel has been supplied or not.

Further, the fuel tank 311 has a fuel property determination device 317 that determines whether or not the fuel stored in the fuel tank 311 is gasoline fuel or alcohol fuel based on the content of alcohol contained in gasoline. The fuel property determination device 317 determines the fuel properties by emitting a laser beam or the like on the fuel to detect the intensity of the reflected light. The fuel property determination device 317 starts in response to the ON setting of a key switch, and performs all-time determination of the fuel properties until the engine 100 stops. For more details regarding such a device as the fuel property determination device 317, refer to JP-A-2005-172466. While it has been described that the fuel properties are all time determined, the fuel properties may instead be determined in accordance with a detection value of the fuel supply sensor 316 after closure of the cap of the fuel tank 311. Still alternatively, the fuel properties may be determined in accordance with the detection value of the fuel increment detection sensor (not shown).

The variable compression ratio engine 100 further includes an intake port 33 and an exhaust port 34 in the cylinder head 30. The intake port 33 flows intake air introduced from the outside into the combustion chamber 23, and the exhaust port 34 flows combustion gas occurring in the combustion chamber into an exhaust manifold (not shown).

Intake valves 35 (two units for each cylinder), respectively, are provided to the intake ports 33. The intake valve 35 is actuated by a variable valve actuation mechanism 200, and causes an open/closure operation of the intake port 33 corresponding to an up/down operation of the piston 21.

Further, an exhaust valve 36 is provided to the exhaust port 34. The exhaust valve 36 is actuated by a cam shaft 37, and causes an open/closure operation of the exhaust port 34 corresponding to the up/down operation of the piston 21. The configuration may be such that the exhaust valve 36 is also actuated by the variable valve actuation mechanism 200, similar to the intake valve 35.

The variable valve actuation mechanism 200 operates to vary the amount of lift, operating angle, and opening and closing timings of the intake valve 35. The variable valve actuation mechanism 200 is described herebelow with reference to FIG. 3.

FIG. 3 is a view showing the configuration of the variable valve actuation mechanism 200. The variable valve actuation mechanism 200 includes pivotal cams 210 (two units per cylinder), a pivotal cam actuator mechanism 220 for lifting the respective pivotal cam 210, and a lift variable mechanism 230 for varying the amount of lift of the intake valve 35.

With reference to FIG. 3, the pivotal cam 210 is fitted rotatably around the outer circumference of a drive shaft 221. The drive shaft 221 extends along a cylinder array and is inserted into the pivotal cam 210.

In the present embodiment, two intake valves 35 are provided for each cylinder, so that two pivotal cams 210 and two valve lifters 211 are provided for each cylinder. The two pivotal cams 210 are coupled together in the same phase state by a cylindrical coupling member 212 rotatably fitted on the drive shaft 221 so as to rotate together in synchronism with one another. As such, the pivotal cam actuator mechanism 220 is provided only for one of the pivotal cams 210. In accordance with the pivotal cam actuator mechanism 220, the pivotal cams 210 are pivoted about the drive shaft 221 in operative association with the crankshaft, whereby the intake valve 35 is actuated by way of the valve lifter 211.

An eccentric cam 222 is fixed by press fitting or the like to the drive shaft 221 of the pivotal cam actuator mechanism 220. The eccentric cam 222 has a circular outer circumferential surface, in which the center of the outer circumferential surface offsets by a predetermined amount from the axial center of the drive shaft 221. The drive shaft 221 rotates in operative association with the rotation of the crankshaft, so that the eccentric cam 222 eccentrically rotates around the axial center of the drive shaft 221.

An annular portion 224 on a base end side of a first link 223 is rotatably fitted on the outer circumferential surface of the eccentric cam 222. A lead end of the first link 223 couples to one end of a rocker arm 226 by way of a coupling pin 225. The other end of the rocker arm 226 couples to an upper end of a second link 228 by way of a coupling pin 227. A lower end of the second link 228 couples to the pivotal cam 210 by way of a coupling pin 229. A substantially central portion of the rocker arm 226 is pivotally journaled by an eccentric cam portion 232 of a control shaft 231 of the lift variable mechanism 230.

Upon rotation of the drive shaft 221 in synchronism with the engine rotation, the eccentric cam 222 eccentrically rotates, whereby the first link 223 pivots in the vertical direction. By the pivoting of the first link 223, the rocker arm 226 pivots about the axis of the eccentric cam portion 232, and the second link 228 vertically pivots. Thereby, the pivotal cam 210 is pivoted about the axis of the drive shaft 221 in a predetermined rotation angle range.

In the variable valve actuation mechanism 200, one end of the drive shaft 221 is inserted in a cam sprocket (not shown). In accordance with relative rotation of the drive shaft 221, the phase relative to the cam sprocket can be varied, whereby the rotation phase of the drive shaft 221 relative to the crankshaft can be varied.

The lift variable mechanism 230 of the variable valve actuation mechanism 200 controls a rotation angle phase of the pivotal cam 210. An actuator (not shown) is provided to one end of the control shaft 231 of the lift variable mechanism 230 by way of a gear or the like. The rotation position of the control shaft 231 is varied by the actuator, and the axial center of the eccentric cam portion 232, which is a pivotal center of the rocker arm 226, pivots around the rotation center of the control shaft 231. In conjunction with the pivoting, the pivot point of the rocker arm 226 is displaced. Thereby, the attitudes of the first and second links 223 and 228 are varied, and the distance between the pivotal center of the pivotal cam 210 and the rotation center of the rocker arm 226 is varied, whereby a pivotal characteristic of the pivotal cam 210 is varied.

FIG. 4 is a diagram showing lift amounts and opening and closing timings of the intake valve 35 in connection with operation of the variable valve actuation mechanism 200. In the diagram, the solid line represents the amount of lift and opening and closing timings of the intake valve 35 when the control shaft 231 is rotated. The broken line represents the opening and closing timings of the intake valve 35 when the phase of the drive shaft 221 relative to the cam sprocket is varied.

As shown in FIG. 4, according to the configuration of the variable valve actuation mechanism 200, lift characteristics of the intake valve 35, namely, the amount of lift, operating angle, and opening and closing timings, can be varied by varying the angle of the control shaft 231 and the phase of the drive shaft 221 relative to the cam sprocket.

Referring back to FIG. 1, the variable compression ratio engine 100 thus configured includes a controller 50 that controls the compression ratio and the variable valve actuation mechanism 200. The controller 50 includes a CPU, ROM, RAM, and I/O interface.

The controller 50 is connected to components, such as the fuel supply sensor 316, the fuel property determination device 317, the fuel injection valve 31, and the spark plug 32, whereby input/output of control signals and sensor detection signals are carried out. In accordance with output signals such as those described above, the controller 50 controls the actuator 42 correspondingly to the engine state to rotate the control shaft 41, thereby to vary the compression ratio. Further, the controller 50 controls the variable valve actuation mechanism 200 to vary the lift characteristics (e.g. the amount of lift, operating angle, and opening and closing timings) of the intake valve 35.

Thus, in the variable compression ratio engine 100 of the first embodiment, the engine compression ratio can be controlled corresponding to the fuel being used. As such, when using gasoline fuel having a lower octane number than alcohol fuel, the compression ratio is adjusted to be lower; and when using alcohol fuel, the compression ratio is adjusted to be higher. Thereby, combustion can be implemented at the optimal compression ratio in the case of either gasoline or alcohol fuel.

In a coupled portion between the control link 14 and the control shaft 41, there occurs a tensile load F as a load resulting from the action of, for example, combustion pressure in a combustion stroke or compression pressure in a compression stroke (see FIGS. 5A and 5B). Thereby, a torque corresponding to the magnitude or level of the tensile load F is imposed on the control shaft 41.

FIGS. 5A and 5B, respectively, are diagrams showing torques occurring in the control shaft 41. FIG. 5A shows a position of the coupling pin 19 in which the compression ratio varies to a low or high compression ratio, and FIG. 5B shows the coupling pin 19 positioned in an intermediate compression ratio range between the low and high compression ratios.

With reference to FIG. 5A, in the first embodiment, the coupling pin 19 is positioned in a position A when the compression ratio varies to the low compression ratio. In this case, an axis line CC of the control link 14 passes across a control shaft center P. Therefore, even when the tensile load F is imposed between the connection section between the control link 14 and the control shaft 41, the torque is not imposed on the control shaft 41. In the event of the low compression ratio, symbol $\theta_A$ represents an angle ("control link angle", herebelow) formed between the axis line CC of the control link 14 in the event of the low compression ratio and a centerline CL passing across the control shaft center P.

On the other hand, the coupling pin 19 is positioned in a position B when the compression ratio varies to the high compression ratio. In this case, similar to the low compression ratio, the axis line CC of the control link 14 passes across the control shaft center P. Thus, even when the tensile load F is imposed, the torque is not imposed on the control shaft 41. The control link angle in the event of the high compression ratio is $\theta_B$, and the angular interval between $\theta_A$ and $\theta_B$ is about 180°.

With reference to FIG. 5B, when the compression ratio varies to an intermediate compression ratio between the low and high compression ratios, the coupling pin 19 is positioned in a position C. More specifically, a condition that an action line of a load acting between the control link 14 (third link) and the coupling pin 19 (eccentric axis portion) is spaced apart at a predetermined distance or larger from the rotation center of the control shaft 41, is satisfied when the engine compression ratio falls in the intermediate compression ratio range between the low and high compression ratios. In this case, the distance between the axis line CC and the control shaft center P takes a value L, so that there occurs torque represented by the multiplication of the tensile load F and the distance L. The control link angle in the event of the intermediate compression ratio is $\theta_C$; that is, the relationship among the compression ratios is $\theta_A < \theta_C < \theta_B$.

Thus, the torque being imposed on the control shaft 41 is minimized in the states of the low compression ratio (position A) and the high compression ratio (position B), and is maximized in the state of the intermediate compression ratio (position C). In FIG. 5B, a hatched area represents a range in which the control link angle $\theta$ is within the range of $\theta_1 < \theta < \theta_2$, and a relatively high torque is imposed. More specifically, an engine state where mechanical work necessary for a unit actuation amount of the actuator 42 is increased larger than a predetermined value, is a state where combustion occurs in the engine 100 in a condition where the action line of the load acting between the third link and the eccentric axis portion is spaced apart at a distance larger than or equal to a predetermined distance from the rotation center of the control shaft 41. Thus, the load (i.e. mechanical work necessary for the unit actuation amount) of the actuator 42 is varied corresponding to a target compression ratio specified for the engine 100, the presence or absence of combustion in the engine 100, or the like. That is, the load is varied corresponding to the engine state.

Consequently, when varying the compression ratio in the case where the control link angle is within the range described above, the control shaft 41 has to be driven in opposition to such a high torque, so that the actuator 42 having an actuation force exceeding such high torque is needed.

However, in the event of varying the compression ratio during operation of a vehicle in which a high tensile load F is imposed, and particularly, in the event of varying the compression ratio from the low compression ratio (position A) to the high compression ratio (position B), the actuator 42 is required to have a large drive force. As such, there arise problems in that, for example, a large actuator 42 is required, and hence the cost is increased.

Taking the above into account, according to the variable compression ratio engine 100 of the first embodiment, the compression ratio is varied in the event that the load on the actuator 42 is reduced. For example, the compression ratio is varied in a cranking event when neither fuel injection nor fuel ignition is yet executed in the event of engine start-up when the torque imposed on the control shaft 41 is reduced. More specifically, in the event that the load (i.e. mechanical work necessary for the unit actuation amount) of the actuator 42 is variable by varying the engine state, the actuation of the actuator 42 is limited when the engine 100 is in the state where the mechanical work necessary for the unit actuation amount of the actuator 42 increases larger than the predetermined value.

With reference to FIGS. 6 to 9, the following describes processing being executed by the controller 50 in an operational range from the engine start-up event to the engine stopping event to cause the compression ratio to be optimized corresponding to the fuel being used.

FIG. 6 is a flow chart representing processing being executed by the controller 50. The processing is executed in response to an operation of turning ON of a key switch from the OFF state, and is continually executed at a fixed cycle, such as a 10 millisecond cycle, until the variable compression ratio engine 100 stops.

First, at step St, the controller 50 determines whether the engine 100 is in a state where fuel injection and ignition operations are executed. The determination regarding the engine state is made in accordance with output signals of the fuel injection valve 31 and the spark plug 32. If the fuel injection and ignition are not executed, then it is determined that the engine 100 is in a cranking event. Then, the processing proceeds to step S2. Otherwise, if the fuel injection and ignition are executed, then it is determined that the engine 100 is in a normal operation event, and the processing proceeds to step S3.

At step S2, the controller 50 executes an in-startup event process, and then the processing terminates. The in-startup event process will be described in more detail below with reference to FIG. 7.

At step S3, the controller 50 determines whether a stopping signal for stopping the engine 100 is present or absent. For example, the processing can be arranged such that a signal for stopping the engine 100 is output in the key-OFF event, and the signal in that event is detected. If the stopping signal is absent, then it is determined that the engine 100 is in the normal operation event, and the processing proceeds to step S4. Otherwise, if the stopping signal is present, it is determined that the engine 100 stops, and the processing proceeds to step S5.

At step S4, the controller 50 executes an in-normal operation event process, and then processing terminates. The in-normal operation event process will be described in detail below with reference to FIG. 8.

At step S5, the controller 50 executes an in-stopping event process, and then the processing terminates. The in-stopping event process will be described in detail below with reference to FIG. 9.

FIG. 7 is a flow chart representing the in-startup event process being executed in the cranking event.

At step S21, the controller 50 determines whether the fuel is alcohol or gasoline fuel in accordance with the detection value of the fuel property determination device 317, and sets a target compression ratio. Then, the processing proceeds to step S22.

At step S22, the controller 50 controls the actuator 42 and thereby starts varying the compression ratio to a target compression ratio of the low or high compression ratio.

At step S23, the controller 50 controls the variable valve actuation mechanism 200 to thereby limit the amount of intake air being introduced into the combustion chamber 23.

More specifically, the variable valve actuation mechanism 200 is controlled to reduce the amount of lift of the intake valve 35 and to advance the opening and closing timings thereof, thereby to reduce the amount of intake air being introduced into the combustion chamber 23. When the amount of intake air is reduced, the compression pressure in a piston elevation event is reduced, whereby the load being imposed on the connection section between the control link 14 and the control shaft 41 is reduced. Thereby, the torque being imposed on the control shaft 41 is reduced.

At step S24, the controller 50 determines whether the control link angle $\theta$ is within the range of $\theta_1 < \theta < \theta_2$. If the control link angle $\theta$ is not within the range of $\theta_1 < \theta < \theta_2$, then it is determined that the torque imposed on the control shaft 41 is low even when the fuel is injected and ignited, and the processing proceeds to step S25. Otherwise, if the control link angle $\theta$ is within the range of $\theta_1 < \theta < \theta_2$, then it is determined that the torque imposed on the control shaft 41 is increased when the fuel is injected and ignited, and the processing maintains the cranking state, with neither injecting nor igniting the fuel, and once goes out of the processing flow. In this manner, in the engine state where the load (i.e. mechanical work necessary for the unit actuation amount) of the actuator 42 increases larger than the predetermined value, the actuation force of the actuator 42 is limited. When the actuator 42 is actuated before the start of combustion in the engine starting event, especially during actuation of the actuator 42 under the condition in which the action line of the load acting between the control link 14 (i.e. third link) and the coupling pin 19 (i.e. eccentric axis portion) is spaced apart at the predetermined amount or larger from the rotation center of the control shaft 231, combustion in the engine 100 is inhibited (steps S24 and S25).

FIG. 8 is a flow chart representing the in-normal operation event process.

At step S41, the controller 50 operates such that the compression ratio varied in the in-startup event process is maintained, and the processing then goes out of the processing flow. That is, in the present embodiment, the compression ratio is not varied during the normal operation of the vehicle.

FIG. 9 is a flow chart representing an in-stopping event process.

At step S51, the controller 50 operates to vary the compression ratio (low or high compression ratio) during operation to the intermediate compression ratio after detecting of the stopping signal of the engine 100. Then, the processing goes out of the processing flow.

FIGS. 10A to 10F, respectively, are timing charts representing operation of the in-startup event process being executed by the controller 50. More specifically, the timing charts exemplify the case where a compression ratio is varied from the intermediate compression ratio to the low compression ratio. In the description herebelow, the processing step numbers (that is, the numbers prefixed with "S") are indicated in parentheses to facilitate the understanding of the correspondence to the flow chart described above.

In the present embodiment, as shown in the block of step S51 of FIG. 9, the engine 400 stops after the compression ratio is set to the intermediate compression ratio in the engine stopping event. Accordingly, the compression ratio in the engine starting event remains at the intermediate compression ratio (FIG. 10A). In this event, when the fuel stored in the fuel tank 311 is determined by the fuel property determination device 317 to be gasoline fuel, and then a target compression ratio is set (S21), the operation for varying the compression ratio is started at time $t_1$ corresponding to the cranking event, and the compression ratio is varied from the intermediate compression ratio to the low compression ratio (FIG. 10A; S22). Then, the engine speed is increased (FIG. 10C), so that the amount of lift of the intake valve 35 is reduced (FIG. 10E), and the closing timing of the intake valve 35 is advanced (FIG. 10F), thereby to reduce the amount of intake air in the cranking event (S23). Thus, the compression pressure in the piston elevation event is reduced by reducing the amount of intake air, thereby to reduce the level of the torque being imposed on the control shaft 41.

At time $t_2$, the compression ratio is varied close to the low compression ratio, the control link angle $\theta$ is reduced less than $\theta_1$, and fuel injection and ignition are started (FIGS. 10B and 10D; S25). More specifically, when fuel injection and ignition are executed at the control link angle $\theta$ falling within the range of $\theta_1 < \theta < \theta_2$, the torque is increased. Thereby, the load on the actuator 42 is increased, so that fuel injection and ignition are started awaiting the timing when the control link angle falls in the range of $\theta \leq \theta_1$ or $\theta \geq \theta_2$ at which the torque occurring in the fuel combustion event is reduced. Then, at time $t_3$, the operation for varying the compression ratio from the intermediate compression ratio to the low compression ratio is completed.

In the present embodiment, in the in-stopping event process (step S5), the engine 100 is stopped at the intermediate compression ratio, but the engine 100 may be stopped at the high compression ratio. Thereby, in a case where the optimal compression ratio is the low compression ratio, the control shaft 41 has a support from the tensile load imposed on the control link 14 when varying the compression ratio from the high compression ratio to the low compression ratio. For this reason, the compression ratio can be varied to the low compression ratio even more quickly. On the other hand, in the case where the optimal compression ratio is the high compression ratio, the compression ratio need not be varied. Consequently, further compactness can be implemented for the actuator 42, which controls the control shaft 41, thereby enabling further cost reduction.

Thus, when stopping the engine 100 with the compression ratio being set to the high compression ratio, the fuel injection and ignition are inhibited until the control link angle θ clears the range of $\theta_1 < \theta < \theta_2$ from the state of the high compression ratio. Alternatively, however, the arrangement can be such that a combustion starting timing in the event of varying the compression ratio is preliminarily set to be retarded or delayed relative to a combustion starting timing in the event of maintaining the compression ratio without being varied, whereby the combustion is started always after the control link angle θ has cleared the condition of $\theta < \theta < \theta_2$. For example, the arrangement can be such that a cranking time period in the event of varying the compression ratio is longer than a cranking time period in the event of maintaining the compression ratio without being varied, and the fuel injection and ignition occur after the elapse of the time period.

According to the first embodiment described above, effects as described herebelow can be obtained.

In the in-startup event process (step S2), the compression ratio is varied in accordance with the detection value of the fuel property determination device 317. Thereby, the vehicle can be operated at a compression ratio corresponding to the fuel properties, such that fuel economy can be improved, and concurrently, output characteristics can be improved.

The compression ratio is varied in the in-startup event process (step S2) in the cranking event, and the amount of intake air is limited by the variable valve actuation mechanism 200. Consequently, the torque being imposed on the control shaft 41 is reduced. Further, the fuel injection and ignition are started awaiting the timing when the control link angle θ is set to the angle at which the torque occurring in the fuel combustion event is reduced. Thereby, a demanded actuation force of the actuator 42 for driving the control shaft 41 can be reduced, so that compactness of the actuator 42 and cost reduction can be accomplished.

Further, torque to be imposed on the control shaft 41 is set to be minimized at the low and high compression ratios. As such, even when the vehicle runs by maintaining the compression ratio varied in the in-startup event process, a holding power of the actuator 42 for maintaining the compression ratio is reduced in the in-normal operation event process (step S4). Thereby, the actuator 42 can be compacted, cost reduction can be accomplished, and the time period until the start-up event is not unnecessarily increased.

Further, the engine 100 is stopped by setting the compression ratio to the intermediate compression ratio in the in-stopping event process (step S5). In this case, in the engine starting event, the compression ratio can be varied from the intermediate compression ratio to the low compression ratio, therefore making it possible to reduce the rotation speed of the control shaft 41. Thereby, the compression ratio can be varied quickly, so that the cranking time period necessary for varying the compression ratio can be prevented from being increased.

A second embodiment of the present invention will be described hereinbelow with reference to FIG. 11. Different from the first embodiment, the second embodiment includes, for example, a lock mechanism 60, which is used to maintain the compression ratio at the intermediate compression ratio, in which the compression ratio is varied not only in the cranking event, but also in either an accelerator-off or throttle-off time period. Description herebelow will be focused on the differences from the first embodiment. In the following description of the second embodiment, like reference numbers represent portions having functions the same as, or similar to, those in the first embodiment, and duplicated descriptions thereof will be appropriately omitted.

FIG. 11 is a schematic view showing a variable compression ratio engine 400 (or, simply "engine", herebelow) of the second embodiment.

The basic configuration of the engine 400 is similar to that of the engine 100 according to the first embodiment, except that, as described above, the engine 400 includes the lock mechanism 60 and the knock sensor 24, for example. The controller 50 is coupled to components, such as the lock mechanism 60 and the knock sensor 24, whereby signals, such as control signals and sensor detected signals, are input and output.

In the event of normal running of the vehicle at the intermediate compression ratio, maximizing torque on the control shaft 41, the lock mechanism 60 prevents rotation of the control shaft 41, thereby to prevent the control shaft 41 from being rotated by the torque to the extent of causing the compression ratio to vary.

The lock mechanism 60 has a configuration including, for example, a positioning hole 61 provided on a shaft end face of the control shaft 41, and a pin (not shown) to be inserted into the positioning hole 61 to prevent the rotation of the control shaft 41. In the event of running of the vehicle at the intermediate compression ratio, the pin (not shown) is pushed out by, for example, hydraulic pressure and is inserted into the positioning hole 61, thereby to perform regulation to prevent the control shaft 41 from being rotated by the torque.

The knock sensor 24 is provided in a side portion of the cylinder block 20. When knocking has occurred in the combustion chamber 23, the knock sensor 24 detects vibration caused by the knocking, and then provides an output to the controller 50.

The controller 50 inputs the output of the knock sensor 24 and other data indicative of, for example, a cooling water temperature and an accelerator pedal depression amount.

In the variable compression ratio engine 400 of the second embodiment, similar to the first embodiment, fuel properties are determined, and the compression ratio is varied in the cranking event to a compression ratio corresponding to the fuel properties. In addition, in the engine 400, the compression ratio is varied in either the accelerator-off or throttle-off time period causing the torque on the control shaft 41 to be lower than in the normal operation event.

With reference to FIGS. 12 to 15, the following describes processing being executed by the controller 50 in an operational range from the engine start-up event to the engine stopping event to cause the compression ratio to be optimized corresponding to the fuel being used.

FIG. 12 is a flow chart representing processing being executed by the controller 50. The processing is executed in response to an operation of turning ON of the key switch from the OFF state, and is continually executed at a fixed cycle, such as a 10 millisecond cycle, until the variable compression ratio engine 400 stops.

First, at step S1, the controller 50 determines whether or not the engine 400 is in a state where fuel injection and ignition operations are executed. The determination regarding the engine state is made in accordance with output signals of the fuel injection valve 31 and the spark plug 32. If the fuel injection and ignition are not executed, then it is determined that the engine 400 is in a cranking event, and the processing proceeds to step S2. Otherwise, if the fuel injection and ignition are executed, then it is determined that the engine 400 is in a normal operation event, and the processing proceeds to step S6.

At step S2, the controller 50 executes an in-startup event process, which is to be executed in the cranking event, and the processing terminates. The in-startup event process will be described in more detail below with reference to FIG. 13.

At step S6, the controller 50 determines whether or not an idle operation is being executed in the vehicle. If the idle operation is not being executed, then the processing proceeds to step S3. Otherwise, the idle operation is being executed, then the processing proceeds to step S7.

At step S7, the controller 50 executes an in-idling process, and then the processing terminates. The in-idling process will be described in more detail below with reference to FIG. 15.

At step S3, the controller 50 determines whether a stopping signal for stopping the engine 400 is present or absent. If the stopping signal is absent, then it is determined that the engine 400 is continually under the operation, and the processing proceeds to step S4. Otherwise, if the stopping signal is present, then the processing proceeds to step S5.

At step S4, the controller 50 executes an in-normal operation event process, and then processing terminates. The in-normal operation event process will be described in detail below with reference to FIG. 14.

At step S5, the controller 50 executes an in-stopping event process, and then the processing terminates. Similar to the first embodiment, in the in-stopping event process, the process for stopping the engine 400 is executed after the aspect ratio has been varied to the intermediate compression ratio. For this reason, the compression ratio of the engine 400 in the subsequent engine starting event is always the intermediate compression ratio.

FIG. 13 is a flow chart representing the in-startup event process being executed in the cranking event.

First, at step S26, the controller 50 determines whether the fuel property determination device 317 is normal or not. More specifically, detection values obtained in detections performed by the fuel property determination device 317 for gasoline, alcohol, and like fuels in, for example, experimentation are preliminarily set for the use of the fuel property determination. Using such values, the determination process is configured so that, when a detection value outside of a predetermined range is detected, it is determined that the fuel property determination device 317 is not normally working. If it is determined that the fuel property determination device 317 is abnormal, then the processing proceeds to step S27. If it is determined that the fuel property determination device 317 is normal, on the other hand, the processing proceeds to step S21.

At step S27, the controller 50 sets "1" to an abnormality flag, and the processing proceeds to step S25.

At step S21, the controller 50 sets a target compression ratio in accordance with the detection value of the fuel property determination device 317. Then, the processing proceeds to step S28.

At step S28, the controller 50 determines whether the variable compression ratio engine 400 is in a cold state or not. In this step, the determination of whether the engine 400 is in the cold state or not is made by a determination of whether or not a detection value T of the cooling water is lower or equal to a predetermined reference value $T_0$ (i.e., $T \leq T_0$). If $T \leq T_0$, then it is determined that the engine 400 is in the cold state. Otherwise, if $T > T_0$, then it is determined that the engine 400 is in the warm state.

In the event that the variable compression ratio engine 400 is in the cold state, friction occurring between the piston 21 and the cylinder 22, for example, is increased, so that the actuation force of the actuator 42 required when the compression ratio is varied is proportionally increased. Such increased friction is added to the load of the actuator 42 in conjunction with a pressure rise due to, for example, compression or combustion in the compression stroke. Thereby, the load of the actuator 42 is significantly increased. For this reason, the arrangement is made not to vary the compression ratio in the cold state of the engine 400. Therefore, if it is determined that the engine 400 is in the warm state, then the processing proceeds to step S22. At step S22, the compression ratio is varied from the intermediate compression ratio to the low compression ratio or the high compression ratio in accordance with the compression ratio having been set at step S21. Since the processing steps after step S22 are similar to those in the first embodiment, descriptions thereof are omitted herefrom for the sake of brevity.

If it is determined that the variable compression ratio engine 400 is in the cold state, then the processing proceeds to step S25, without varying the compression ratio.

According to the second embodiment, in the event that, for example, the fuel property determination device 317 is determined to be abnormal or the variable compression ratio engine 400 is determined to be in the cold state, the compression ratio is not varied in the cranking event. However, the fuel injection and ignition are started at step S25 at the intermediate compression ratio as having been set in the engine starting event. In this event, the control shaft 41 is locked in position by the lock mechanism 60. Accordingly, even when the control link angle is varied from θ to $θ_C$, and the vehicle undergoes normal running at the intermediate compression ratio, which maximizes torque being imposed on the control shaft 41, the control shaft 41 is prevented from being rotated by the torque to the extent of causing the compression ratio to vary.

FIG. 14 is a flow chart representing the in-normal operation event process being executed in the normal operation event.

At step S41, the controller 50 operates such that, during the normal operation of the vehicle, the compression ratio is maintained without being varied. Then, the processing proceeds to step S42.

At step S42, the controller 50 determines whether or not the operation of the fuel property determination device 317 is abnormal and the abnormality flag is set to "1". If the abnormality flag is "1", then the target compression ratio cannot be set in accordance with operation of the fuel property determination device 317. Then, the processing proceeds to step S43. Otherwise, if the operation of the fuel property determination device 317 is normal and the abnormality flag is not "1", then the processing once goes out of the processing flow.

At step S43, the controller 50 detects knocking in the combustion chamber 23 in accordance with the operation of the knock sensor 24, and sets a target compression ratio. Then, the processing once goes out of the processing flow.

More specifically, when the operation of the fuel property determination device 317 is abnormal, the fuel properties are determined by using a value detected by the knock sensor 24. Gasoline fuel is lower in octane number than alcohol fuel, so that, even under the same compression ratio, gasoline fuel is more prone to knocking than alcohol fuel. Therefore, when the vehicle is run without varying the compression ratio in the in-startup event process, knocking can occur with gasoline fuel depending on the operation condition. However, detection of knocking by the knock sensor 24 makes it possible to determine whether the fuel being used is gasoline or alcohol fuel.

FIG. 15 is a flow chart representing the in-idling event process being executed during an idling time period as an accelerator-off or throttle-off time period. The accelerator-off or throttle-off time period includes, for example, a "deceleration coast" event, in which fuel cutting is effected, and an idling-off stopping event of an idling-off stopping vehicle.

At step S71, the controller 50 determines whether the variable compression ratio engine 400 is in the cold state or not. The determination regarding the cold state is made by a determination of whether or not a detection value T of the cooling water is lower or equal to a predetermined reference value $T_0$ (i.e., $T \leq T_0$). If $T \leq T_0$, then it is determined that the engine 400 is in the cold state. Otherwise, if $T > T_0$, then it is determined that the engine 400 is in the warm state. In the event that the engine 400 is in the warm state, then the processing proceeds to step S72. Otherwise, if it is determined that the engine 400 is in the cold state, then the processing once goes out of the processing flow, and enters a standby state until the engine 400 is warmed up.

At step S72, the controller 50 determines whether a target compression ratio has been set. More specifically, if the fuel property determination device 317 is normally operating, then a target compression ratio set in the in-startup event process is detected. Otherwise, if the operation of the fuel property determination device 317 is abnormal, then a target compression ratio set through the knock sensor 24 in the in-normal operation event process is detected, and the processing proceeds to step S73. However, even in the event that the operation of the fuel property determination device 317 is abnormal, a target compression ratio may have not been set through the knock sensor 24. In this case, the processing once goes out of the processing flow and enters a standby state until the target compression ratio is set.

At step S73, the controller 50 controls the actuator 42 and thereby starts varying the compression ratio to a target compression ratio closer to either the low or high compression ratio. Then, the processing proceeds to step S74.

At step S74, the controller 50 determines in accordance with a detection value $\Delta A$ of the accelerator pedal depression amount whether an acceleration demand is present or absent.

More specifically, upon starting of acceleration in response to an acceleration demand during a compression ratio varying operation, the tensile load F, which is being imposed on the connection section between the control link 14 and the control shaft 41, increases, thereby imposing high torque on the control shaft 41. This increases a demanded actuation amount of the actuator 42 to rotate the control shaft 41. To overcome this problem, in the second embodiment, it is determined whether or not an acceleration demand is present during the compression ratio varying operation, in which, if the acceleration demand is present, the processing routine from step S75 to step S77 is executed.

The determination regarding the presence or absence of the acceleration demand is determined by making a determination of whether or not the detection value $\Delta A$ is larger than or equal to a reference value $\Delta A_0$. If $\Delta A \geq \Delta A_0$, then it is determined that the acceleration demand is present; otherwise if $\Delta A < \Delta A_0$, then it is determined that the acceleration demand is absent. If the acceleration demand is absent, then the processing once goes out of the processing flow. Otherwise, if the acceleration demand present, then the processing proceeds to step S75.

At step S75, the controller 50 determines whether or not the control link angle θ is within the range of $\theta_1 < \theta < \theta_2$. If the control link angle θ is not within the range of $\theta_1 < \theta < \theta_2$, then it is determined that the torque imposed on the control shaft 41 is low even when the fuel is injected and ignited in response to the acceleration demand, and the processing proceeds to step S77. Otherwise, if the control link angle θ falls within the condition of $\theta_1 < \theta < \theta_2$, then it is determined that the torque imposed on the control shaft 41 is increased when the fuel is injected and ignited in response to the acceleration demand, then the processing proceeds to step S76.

At step S76, the controller 50 executes intake air limiting acceleration control that effects acceleration by limiting the amount of intake air being introduced in the combustion chamber 23. Then, the processing once goes out of the processing flow.

More specifically, the controller 50 controls the variable valve actuation mechanism 200, thereby to reduce the amount of lift of the intake valve 35. In this manner, an amount of intake air less than the amount of intake air required by the acceleration demand is introduced into the combustion chamber 23, thereby to reduce torque being imposed on the control shaft 41. However, the method for limiting the amount of intake air is not limited only to the above-described method in which the amount of lift of the intake valve 35 is reduced. The method may be such that the operating angle, opening/closing timing, or the like, of the intake valve 35 is adjusted or the throttle opening is adjusted.

At step S77, the controller 50 does not limit the amount of intake air, but executes normal acceleration control for effecting acceleration in response to an acceleration demand. Then, the processing once goes out of the processing flow.

FIGS. 16A to 16F, respectively, are timing charts representing operation of the in-startup event process being executed by the controller 50. More specifically, the timing charts exemplify the case where the compression ratio is varied from the intermediate compression ratio to the low compression ratio during idling (idling event).

In the second embodiment also, the engine 400 stops after the compression ratio is set to the intermediate compression ratio in the engine stopping event. Accordingly, the compression ratio in the engine starting event remains at the intermediate compression ratio (FIG. 16A).

In this event, in accordance with the operation of either the fuel property determination device 317 or the knock sensor 24, it is determined that the fuel stored in the fuel tank 311 is gasoline fuel, and then a target compression ratio is set (S21 or S43). If it is determined that the variable compression ratio engine 400 is not in the cold state (S71: "No"), the controller 50 varies the compression ratio from the intermediate compression ratio to the low compression ratio (S73).

More specifically, when the vehicle enters an idling state (S6: "Yes"), the compression ratio varying operation is started at time $t_4$ (FIG. 16A; S73). Then, if at time $t_5$ an acceleration demand is present (FIG. 16E; S74: "Yes") and if the control link angle θ is within the range of $\theta_1 < \theta < \theta_2$, (S75: "Yes"), then the closing timing of the intake valve 35 is eventually delayed so that the amount of intake air is slightly increased corresponding to increase in the engine speed (FIG. 6C, 16F). Further, the amount of lift of the intake valve 35 is set to be low until time t6, thereby to limit the intake air being introduced into the combustion chamber 23 (FIG. 16E; S76). More specifically, when the engine speed is increased in the event that the control link angle θ is within the range of $\theta_1 < \theta < \theta_2$, torque is increased, thereby increasing the load on the actuator 42. As such, the intake air is limited until the control link angle (θ) falls within $\theta \leq \theta_1$ or $\theta \geq \theta_2$ at which the torque is reduced. In this manner, the amount of intake air is reduced to reduce, for example, the compression pressure and combustion pressure imposed on the piston 21, whereby the torque being imposed on the control shaft 41 is reduced. Then, at time $t_7$, the operation of varying the compression ratio from the intermediate compression ratio to the low compression ratio is completed.

According to the second embodiment described above, effects as described herebelow can be obtained.

In the in-startup event process (step S2), the compression ratio is varied in accordance with the detection value of the fuel property determination device 317. Thereby, the vehicle can be operated at a compression ratio corresponding to the fuel properties, and effects similar to those of the first embodiment can be obtained.

In the in-idling process (step S7), even when the compression ratio is not varied in the cranking event, the compression ratio is varied in the idling event in which the torque is lower than in the normal operation event. As a result, the engine 400 can be operated at a compression ratio corresponding to the fuel properties, consequently making it possible to improve fuel economy and output characteristics.

The compression ratio is varied in the in-startup event process (step S2) in the cranking event where the engine 400 is in the warm state where friction of a piston etc. is reduced, and the amount of intake air is limited by the variable valve actuation mechanism 200. Consequently, the torque being imposed on the control shaft 41 can be reduced. Thereby, a demanded actuation force of the actuator 42 for driving the control shaft 41 can be reduced, so that compactness of the actuator 42 and cost reduction can be accomplished.

Further, in the in-idling process (step S7), even when an acceleration demand is present during the compression ratio varying operation, the amount of intake air is limited until the control link angle θ falls in the range causing the torque to be reduced. In this manner, the compression pressure and combustion pressure imposed on the piston 21, whereby the torque being imposed on the control shaft 41 is reduced. As a result, compactness of the actuator 42 and cost reduction can be accomplished.

Further, since the variable compression ratio engine 400 includes the knock sensor 24, the fuel properties can be determined by detecting knocking during the normal operation. Consequently, even when the fuel property determination device 317 fails in operation, the vehicle can be operated at a compression ratio corresponding to the fuel properties, therefore making it possible to improve fuel economy and output characteristics.

It should be apparent that the present embodiment is not limited to the above, but can be modified in various ways. For example, similar to first embodiment, also in the in-stopping event process (step S5) of the second embodiment, the engine 400 need not be stopped at the intermediate compression ratio, but may be stopped at the high compression ratio. Thereby, when varying the compression ratio from the high compression ratio to the low compression ratio in the case where the optimal compression ratio is the low compression ratio, the control shaft 41 has a support from the tensile load imposed on the control link 14. As such, the compression ratio can be varied to the low compression ratio even more quickly. Alternatively, in the case where the optimal compression ratio is the high compression ratio, the compression ratio need not be varied. Thereby, further compactness can be implemented for the actuator 42, which controls the control shaft 41, consequently enabling further cost reduction.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

The invention claimed is:

1. A method of controlling an actuator for actuating a variable compression ratio mechanism that causes a compression ratio of an engine to vary, the method comprising:
setting a compression ratio corresponding to a state of the engine;
actuating the actuator so that the compression ratio is set;
determining an amount of mechanical work necessary for a unit actuation of the actuator;
determining that the engine is in a state limiting actuation of the actuator when the mechanical work necessary for a unit actuation of the actuator exceeds a predetermined non-zero value; and
limiting actuation of the actuator when the engine is in the state limiting actuation of the actuator.

2. The method according to claim 1, wherein the engine state limiting actuation of the actuator is a combustion state of the engine.

3. The method according to claim 2, further comprising inhibiting combustion in the engine during actuation of the actuator.

4. The method according to claim 2, further comprising actuating the actuator before combustion in an engine starting event.

5. The method according to claim 1, wherein the variable compression ratio mechanism includes:
a first link pivotably coupled to a piston;
a second link pivotably coupled to the first link and pivotably fitted to a crankshaft;
a control shaft, rotatably supported by a cylinder block, and parallel to the crankshaft, that includes an eccentric axis portion eccentric relative to a rotational axial center of the control shaft; and
a third link that is rotatably coupled to the second link by a coupling pin and that is pivotable about a pivotal axis center coincident with the eccentric axis portion of the control shaft,
wherein the engine state limiting actuation of the actuator is a combustion state of the engine under a condition where an action line of a load acting between the third link and the eccentric axis portion is spaced apart from a rotation center of the control shaft at a predetermined distance or larger.

6. The method according to claim 5, wherein the condition where the action line of the load acting between the third link and the eccentric axis portion is spaced apart from a rotation center of the control shaft at a predetermined distance or larger, is satisfied when the compression ratio of the engine is within a range of an intermediate compression ratio between a low compression ratio and a high compression ratio.

7. The method according to claim 5, further comprising inhibiting combustion of the engine during actuation of the actuator under the condition where the action line of the load acting between the third link and the eccentric axis portion is spaced apart from a rotation center of the control shaft at a predetermined distance or larger.

8. The method according to claim 5, further comprising actuating the actuator before combustion in an engine starting event.

9. The method according to claim 8, further comprising:
determining whether or not to vary a compression ratio in the engine starting event; and
when varying the compression ratio, setting a cranking time period in the engine starting event to be longer than a cranking time period in a case where the compression ratio is maintained.

10. The method according to claim 8, further comprising:
determining whether or not to vary a compression ratio in the engine starting event; and
when varying the compression ratio, setting a combustion starting timing in the engine starting event to be delayed relative to a combustion starting timing in a case where the compression ratio is maintained.

11. The method according to claim 1, further comprising reducing an amount of intake air during varying of the compression ratio of the engine.

12. The method according to claim 1, further comprising:
detecting an alcohol content of gasoline being used in the engine; and
setting the compression ratio of the engine to be higher as the alcohol content is higher.

13. The method according to claim 1, further comprising stopping the engine by setting the compression ratio to a high compression ratio when stopping the engine.

14. The method according to claim 1, further comprising stopping the engine by setting the compression ratio to an intermediate compression ratio between a high compression ratio and a low compression ratio when stopping the engine.

15. The method according to claim 13, wherein the engine state limiting the actuation of the actuator is a state other than one of accelerator-off and throttle-off states.

16. The method according to claim 13, wherein the engine state limiting the actuation of the actuator is either a state other than one of accelerator-off and throttle-off states or a pre-warmup state of the engine.

17. The method according to claim 15, further comprising:
determining whether or not an acceleration demand is present; and
reducing an amount of intake air when the acceleration demand is present during varying of the compression ratio.

18. The method according to claim 14, wherein the engine state limiting the actuation of the actuator is a state other than one of accelerator-off and throttle-off states, the method further comprising:
fixing a compression ratio being adapted during combustion of the engine to the intermediate compression ratio; and
varying the compression ratio by actuating the actuator in one of accelerator-off and throttle-off states after combustion of the engine is effected in the state where the compression ratio is fixed to the intermediate compression ratio.

19. The method according to claim 14, wherein the engine state limiting the actuation of the actuator is either a state other than one of accelerator-off and throttle-off states or a pre-warmup state of the engine, the method further comprising:
fixing a compression ratio being adapted during combustion of the engine to the intermediate compression ratio; and
varying the compression ratio by actuating the actuator in one of accelerator-off and throttle-off states after combustion of the engine is effected in the state where the compression ratio is fixed to the intermediate compression ratio.

20. The method according to claim 18, further comprising:
determining whether an acceleration demand is present or not; and
reducing an amount of intake air when the acceleration demand is present during varying of the compression ratio.

21. The method according to claim 12, further comprising:
determining whether or not an abnormality has occurred in the detection of the alcohol content; and
detecting the presence or absence of knocking occurring in a combustion chamber of the engine,
wherein, when an abnormality has occurred in the detection of the alcohol content, the compression ratio is varied in accordance with the detected presence or absence of knocking.

22. A variable compression ratio engine, comprising:
means for setting a compression ratio corresponding to a state of the engine;
means for actuating an actuator connected to a variable compression ratio mechanism so that the compression ratio is set;
means for determining an amount of mechanical work necessary for a unit actuation of the actuator;
means for determining that the engine is in a state limiting actuation of the actuator when the mechanical work necessary for a unit actuation of the actuator exceeds a predetermined non-zero value; and
means for limiting the actuation of the actuator when the engine is in the state limiting actuation of the actuator.

23. A variable compression ratio engine, comprising:
a piston disposed in a cylinder bore and constituting a combustion chamber;
a variable compression ratio mechanism connected to the piston and causing a top dead center position of the piston to vary;
an actuator connected to the variable compression ratio mechanism to actuate the variable compression ratio mechanism; and
a controller connected to the actuator to control an engine state and the actuator,
wherein the controller performs operations including:
setting a compression ratio corresponding to a state of the engine;
actuating the actuator so that the compression ratio is set;
determining an amount of mechanical work necessary for a unit actuation of the actuator;
determining that the engine is in a state limiting actuation of the actuator when the mechanical work necessary for a unit actuation of the actuator exceeds a predetermined non-zero value; and
limiting actuation of the actuator when the engine is in the state limiting actuation of the actuator.

24. The variable compression ratio engine according to claim 23, wherein the variable compression ratio mechanism includes:
a first link pivotably coupled to the piston;
a second link pivotably coupled to the first link and pivotably fitted to a crankshaft;
a control shaft, rotatably supported by a cylinder block, and parallel to the crankshaft, that includes an eccentric axis portion eccentric relative to a rotational axial center of the control shaft; and
a third link that is rotatably coupled to the second link by a coupling pin and that is pivotable about a pivotal axis center coincident with the eccentric axis portion of the control shaft.

25. The variable compression ratio engine according to claim 24, wherein the engine state limiting actuation of the actuator is a combustion state of the engine.

26. The variable compression ratio engine according to claim 24, wherein the engine state limiting actuation of the actuator is a combustion state of the engine under a condition where an action line of a load acting between the third link and the eccentric axis portion is spaced apart from a rotation center of the control shaft at a predetermined distance or larger.

27. The variable compression ratio engine according to claim 26, wherein the condition where the action line of the load acting between the third link and the eccentric axis portion is spaced apart from a rotation center of the control shaft at a predetermined distance or larger, is satisfied when the compression ratio of the engine is within a range of an intermediate compression ratio between a low compression ratio and a high compression ratio.

28. The variable compression ratio engine according to claim 23, the controller further performs an operation of reducing an amount of intake air during varying of the compression ratio of the engine.

29. The variable compression ratio engine according to claim 23, wherein the controller further performs an operation of stopping the engine by setting the compression ratio to a high compression ratio when stopping the engine.

30. The variable compression ratio engine according to claim 23, wherein the controller further performs an operation of stopping the engine by setting the compression ratio to an intermediate compression ratio between a high compression ratio and a low compression ratio when stopping the engine.

31. The variable compression ratio engine according to claim 29, wherein the engine state limiting actuation of the actuator is a state other than one of accelerator-off and throttle-off states.

32. The variable compression ratio engine according to claim 29, wherein the engine state limiting actuation of the actuator is either a state other than one of accelerator-off and throttle-off states or a pre-warmup state of the engine.

33. The variable compression ratio engine according to claim 31, wherein the controller further performs operations of:
   determining whether or not an acceleration demand is present; and
   reducing an amount of intake air when the acceleration demand is present during varying of the compression ratio.

34. The variable compression ratio engine according to claim 30, wherein
   the engine state limiting actuation of the actuator is a state other than one of accelerator-off and throttle-off states,
   the engine further comprises means for maintaining the compression ratio at the intermediate compression ratio, and
   the controller further performs operations of:
      fixing a compression ratio being adapted during combustion of the engine to the intermediate compression ratio; and
   varying the compression ratio by actuating the actuator in one of accelerator-off and throttle-off states after combustion of the engine is effected in the state where the compression ratio is fixed to the intermediate compression ratio.

35. The variable compression ratio engine according to claim 30, wherein
   the engine state limiting actuation of the actuator is a state other than one of accelerator-off and throttle-off states,
   the engine further comprises a lock mechanism for maintaining the compression ratio at the intermediate compression ratio, and
   the controller further performs operations of:
      fixing a compression ratio being adapted during combustion of the engine to the intermediate compression ratio; and
      varying the compression ratio by actuating the actuator in one of accelerator-off and throttle-off states after combustion of the engine is effected in the state where the compression ratio is fixed to the intermediate compression ratio.

36. The variable compression ratio engine according to claim 34, wherein the controller further performs operations of:
   determining whether or not an acceleration demand is present; and
   reducing an amount of intake air when the acceleration demand is present during varying of the compression ratio.

* * * * *